(12) United States Patent
Lynam et al.

(10) Patent No.: US 8,186,741 B2
(45) Date of Patent: May 29, 2012

(54) WINDOW ASSEMBLY FOR VEHICLE

(75) Inventors: Niall R. Lynam, Holland, MI (US);
Peter J. Whitehead, Holland, MI (US);
David E. Nestell, Spring Lake, MI (US);
Loren B. Renkema, Wyoming, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/776,783

(22) Filed: May 10, 2010

(65) Prior Publication Data

US 2010/0213736 A1    Aug. 26, 2010

Related U.S. Application Data

(60) Division of application No. 11/768,260, filed on Jun. 26, 2007, now Pat. No. 7,712,809, which is a continuation of application No. 11/289,092, filed on Nov. 29, 2005, now Pat. No. 7,234,756, which is a continuation of application No. 10/727,731, filed on Dec. 3, 2003, now Pat. No. 6,969,101, which is a division of application No. 09/679,997, filed on Oct. 5, 2000, now Pat. No. 6,669,267.

(60) Provisional application No. 60/159,661, filed on Oct. 15, 1999, provisional application No. 60/215,324, filed on Jun. 30, 2000.

(51) Int. Cl.
*B60J 7/00* (2006.01)
(52) U.S. Cl. ........................... 296/146.2; 49/502
(58) Field of Classification Search ................ 296/201, 296/146.2, 146.3, 146.15, 146.16, 96.21, 296/96.11; 49/502; 52/204.51
See application file for complete search history.

(56) References Cited

U.S. PATENT DOCUMENTS 3,927,492 A * 12/1975 Carson ........................... 49/141
4,125,244 A   11/1978 Lukey ........................ 248/475.1
4,454,688 A    6/1984 Rest et al. ....................... 49/502
(Continued)

FOREIGN PATENT DOCUMENTS

EP    0286836    10/1988
(Continued)

OTHER PUBLICATIONS

Communication of European Search Report of European Application No. 00650152.2, 4 pages.

*Primary Examiner* — Joseph Pape
(74) *Attorney, Agent, or Firm* — Gardner, Linn, Burkhart & Flory, LLP

(57) ABSTRACT

A mirror assembly includes a reflective element portion and a molded portion formed of a multi-void, lightweight structure. The multi-void, lightweight structure may be formed by injecting a gas into an injection mold while the molded portion is being molded, resulting in a multi-void aerated molded structure having multiple-voids introduced during the molding step. A window assembly for a vehicle may include an outer frame portion, an inner frame portion hingedly attached to the outer frame portion, and at least one sealing element established along a sealing portion of the outer and/or inner frame portions. The outer frame portion may be pivoted relative to the inner frame portion and about the hinge portions to a closed position. The outer frame portion may be connected to the inner frame portion when in the closed position to secure the at least one sealing element therebetween.

12 Claims, 13 Drawing Sheets

U.S. PATENT DOCUMENTS

| | | | |
|---|---|---|---|
| 4,604,830 A | 8/1986 | Maeda et al. | 49/374 |
| 4,608,779 A | 9/1986 | Maeda et al. | 49/374 |
| 4,656,784 A | 4/1987 | Brachmann | 49/491 |
| 4,711,052 A | 12/1987 | Maeda et al. | 49/502 |
| 4,843,762 A | 7/1989 | Grier et al. | 296/146.5 X |
| 4,845,894 A | 7/1989 | Herringshaw et al. | 296/146.5 X |
| 4,875,307 A | 10/1989 | Barbero | 49/374 |
| 4,882,842 A | 11/1989 | Basson et al. | 296/146.5 X |
| 4,917,433 A | 4/1990 | Tomforde | 296/146.5 |
| 4,924,630 A | 5/1990 | Lomasney et al. | 296/146.5 X |
| 4,932,161 A | 6/1990 | Keys et al. | 49/491 |
| 4,943,109 A | 7/1990 | Skrbina et al. | 296/146.5 X |
| 4,945,681 A | 8/1990 | Nozaki et al. | 49/495 |
| 5,040,333 A | 8/1991 | Mesnel et al. | 49/374 |
| 5,050,663 A * | 9/1991 | Rhoads et al. | 160/231.2 |
| 5,054,242 A | 10/1991 | Keys et al. | 49/491 |
| 5,127,191 A | 7/1992 | Ohta | 296/146.5 X |
| 5,139,307 A | 8/1992 | Koops et al. | 296/201 |
| 5,345,719 A | 9/1994 | Karwande | 49/502 |
| 5,371,659 A | 12/1994 | Pastrick et al. | 362/83.1 |
| 5,424,898 A | 6/1995 | Larson et al. | 361/101 |
| 5,462,482 A | 10/1995 | Grimes | 296/146.5 X |
| 5,497,306 A | 3/1996 | Pastrick | 362/83.1 |
| 5,505,024 A | 4/1996 | DeRees et al. | 296/146.5 X |
| 5,566,510 A | 10/1996 | Hollingshead et al. | 49/479.1 |
| 5,584,144 A | 12/1996 | Hisano | 296/146.5 X |
| 5,659,423 A | 8/1997 | Schierbeek et al. | 359/604 |
| 5,669,699 A | 9/1997 | Pastrick et al. | 362/83.1 |
| 5,670,935 A | 9/1997 | Schofield et al. | 340/461 |
| 5,675,937 A * | 10/1997 | Stebel | 49/453 |
| 5,702,148 A | 12/1997 | Vaughan et al. | 296/146.9 |
| 5,732,509 A | 3/1998 | Buehler et al. | 49/440 |
| 5,743,047 A | 4/1998 | Bonne et al. | 49/490.1 |
| 5,746,471 A | 5/1998 | Teramoto et al. | 296/146.1 |
| 5,779,956 A | 7/1998 | Hollingshead et al. | 264/138 |
| 5,787,645 A | 8/1998 | Heim et al. | 296/146.5 X |
| 5,791,088 A | 8/1998 | Martinelli et al. | 49/375 |
| 5,796,176 A | 8/1998 | Kramer et al. | 307/10.1 |
| 5,798,575 A | 8/1998 | O'Farrell et al. | 307/10.1 |
| 5,823,654 A | 10/1998 | Pastrick et al. | 362/83.1 |
| 5,846,463 A | 12/1998 | Keeney et al. | 264/135 |
| 5,857,731 A | 1/1999 | Heim et al. | 296/146.2 |
| 5,889,624 A | 3/1999 | Dickenson | 359/841 |
| 5,935,356 A | 8/1999 | Soldner | 156/71 |
| 5,966,874 A | 10/1999 | Repp et al. | 49/398 |
| 6,015,182 A | 1/2000 | Weissert et al. | 296/146.5 X |
| 6,036,255 A | 3/2000 | Lester et al. | |
| 6,086,138 A | 7/2000 | Xu et al. | 296/146.15 |
| 6,086,139 A | 7/2000 | Heim et al. | 296/146.5 |
| 6,176,542 B1 | 1/2001 | Gooding et al. | 296/146.5 X |
| 6,176,602 B1 | 1/2001 | Pastrick et al. | 362/494 |
| 6,220,650 B1 | 4/2001 | Davis et al. | 296/146.16 |
| 6,243,218 B1 | 6/2001 | Whitehead | 359/877 |
| 6,276,821 B1 | 8/2001 | Pastrick et al. | 362/494 |
| 6,291,905 B1 | 9/2001 | Drummond et al. | 307/10.1 |
| 6,310,738 B1 | 10/2001 | Chu | 359/883 |
| 6,669,267 B1 | 12/2003 | Lynam et al. | |
| 6,969,101 B2 | 11/2005 | Lynam et al. | |
| 7,234,756 B2 | 6/2007 | Lynam et al. | |
| 7,607,722 B2 * | 10/2009 | Frett et al. | 296/190.04 |
| 7,712,809 B2 | 5/2010 | Lynam et al. | |

FOREIGN PATENT DOCUMENTS

| | | |
|---|---|---|
| EP | 0524447 | 1/1993 |
| FR | 1166064 | 11/1958 |
| WO | WO 9010555 | 9/1990 |

* cited by examiner

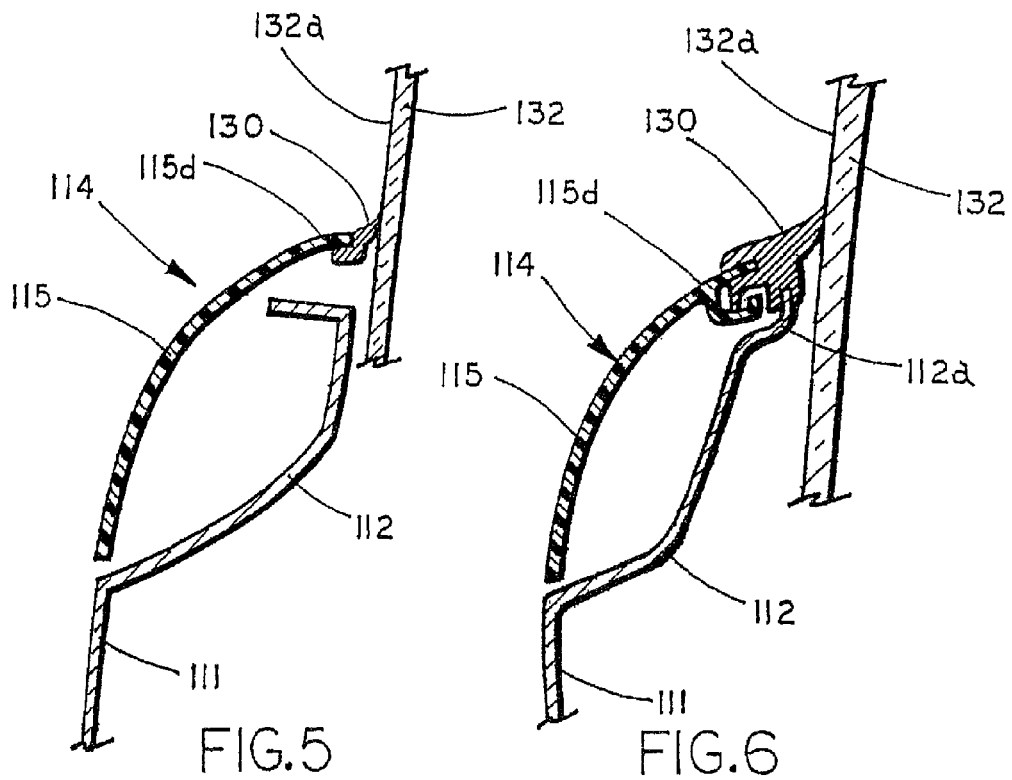
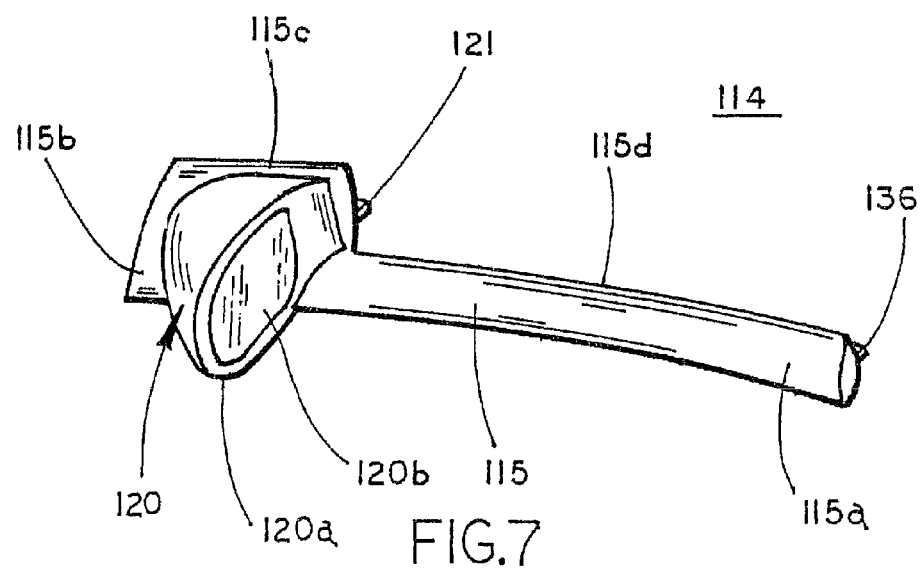

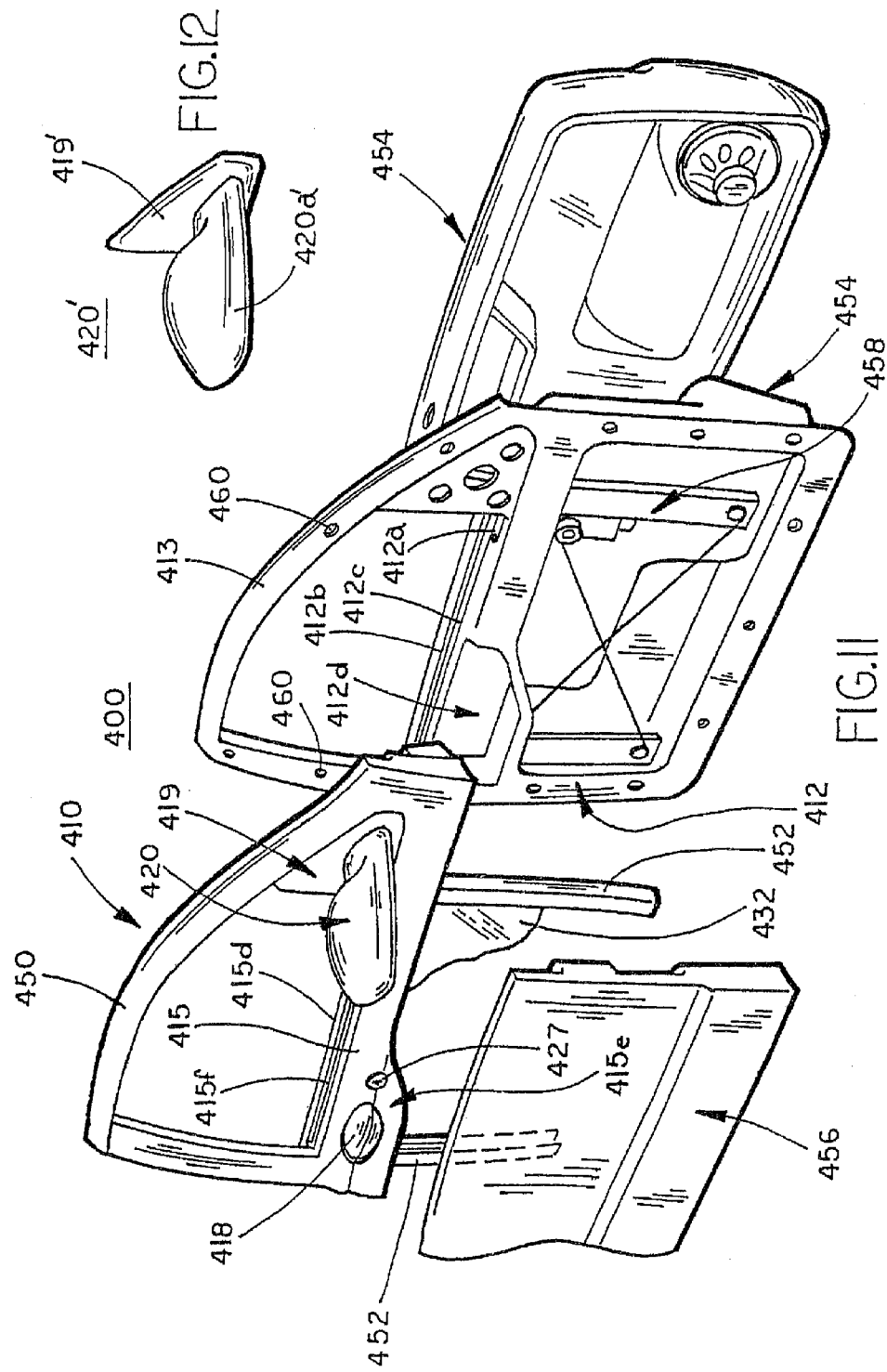

WINDOW ASSEMBLY FOR VEHICLE

CROSS REFERENCE TO RELATED APPLICATIONS

The present application is a division of U.S. patent application Ser. No. 11/768,260, filed Jun. 26, 2007, now U.S. Pat. No. 7,712,809, which is a continuation of U.S. patent application Ser. No. 11/289,092, filed Nov. 29, 2005, now U.S. Pat. No. 7,234,756, which is a continuation of U.S. patent application Ser. No. 10/727,731, filed Dec. 3, 2003, now U.S. Pat. No. 6,969,101, which is a division of U.S. patent application Ser. No. 09/679,997, filed Oct. 5, 2000 by Lynam et al. for EXTERIOR ACCESSORY MODULE FOR VEHICULAR MODULAR DOOR, now U.S. Pat. No. 6,669,267, which claims priority from U.S. Provisional Applications, Ser. No. 60/159,661, filed Oct. 15, 1999 by Lynam, and Ser. No. 60/215,324, filed Jun. 30, 2000 by Whitehead et al., which are all hereby incorporated herein by reference in their entireties.

BACKGROUND OF THE INVENTION

This invention relates generally to vehicle door assemblies and, more particularly, to an exterior accessory module, such as an exterior rearview mirror and/or door handle assembly, which is mountable on a door for a vehicle.

Exterior rearview mirrors are mounted at one or both sides of a vehicle to provide a driver of the vehicle with a view rearwardly and sidewardly of the vehicle. The mirror assemblies may comprise a mirror or head portion and a mounting portion, which is secured to the side of the vehicle. The head portion may be movable to break away from the mounting portion and fold along the side of the vehicle, and may even be a power folding mirror assembly which is foldable along the side of the vehicle in response to a control within the vehicle.

Typically, mirror manufacturers provide the complete mirror assembly, including the head and mounting portions, to the vehicle assembly plant. The mirror assembly may also be painted or colored by the mirror manufacturer, in order to avoid masking concerns at the vehicle assembly plant. The mirror assembly is attached to the side of the door or to a trim piece or sail secured alongside the door or window. The mirror assembly is installed to the door panel of the vehicle door at the vehicle assembly plant as the body of the vehicle travels along the assembly line.

Handles for the doors are also typically provided by the door manufacturer and are specific to each particular door, depending on the color and/or style of the door. The handles are installed to the door frame along with the external skin or outer cover of the door. Because the styles and colors of the handles may vary between applications, especially if the handle is molded in color to match a paint color that will be painted on the door at the vehicle assembly plant, this results in additional part numbers for each door assembly having a different handle style and/or color, even though the internal door frame and/or unpainted external covers of the doors may be common parts.

Recently, vehicle manufacturers have desired modular door assemblies to be assembled remotely from the vehicle assembly line and provided to the vehicle assembly plant as a single unit. The modular doors comprise the door frame, door body and door panels, and preferably include some or all of the accessories for the doors, such as the handle and lock mechanisms, windows and window mechanisms, speakers, lights, regulators, hinge components, accessory controls or switches, such as controls for adjusting windows, locks, seats, mirrors, cabin temperature settings and the like, trim pieces and exterior mirrors and the like. It is desirable for the modular door manufacturer to supply a variety of door and vehicle models and designs using a common door frame or chassis. The various components and panels are typically secured about the door frame to complete the door assembly. The modular doors are shipped to the vehicle assembly plant as a single unit and installed to the vehicle body on the assembly line. This allows a single manufacturer to manufacture the door module and requires less operator processes in the vehicle assembly plant.

Although the modular doors provide significant benefits to the vehicle manufacturer, exterior mirror assemblies have heretofore presented particular problems with the modular door approach. This is because exterior mirrors may protrude significantly outwardly from the side of the modular door, thus causing difficulties in packaging and shipping the modular doors to the assembly line. Furthermore, the mirror head portions and also the mounting portions are typically painted by the mirror manufacturer before installing the mirror assembly to the vehicle in order to avoid masking concerns.

Additional issues arise when mirror assemblies are provided with various optional accessories, such as exterior temperature sensors, security lights, motors or actuators for adjusting the reflector and/or the housing of the mirror relative to the vehicle, and the like. The additional options within the mirror assemblies lead to further parts proliferation of the modular doors, since each different mirror assembly or option associated therewith requires each modular door upon which it is installed to have a separate part number or code for the vehicle assembly plant. This number is then different from the other modular doors shipped to the assembly plant, which may otherwise be substantially identical in construction.

Many automobile manufacturers today prefer to assemble "skeletons" of the vehicle (i.e. the structural frame of the doors and body), and add the interior and exterior components to the frame as the frame moves along the assembly line. Typically, the door frames of the vehicle are stamped and installed to the vehicle as part of the "body in white" of the vehicle. The trim, glass, and other interior and exterior components are added later as the vehicle proceeds down the assembly line. However, it is difficult to add many of the components to the doors, since the components are typically installed from the interior of the vehicle. Some doors receive an interior modular cassette on their interior sides. However, the cassettes include interior components only and may include speakers, window regulators, window crank mechanisms, motors, shields or the like. In some cases, due to the space constraints within the vehicle and access to the components of the doors, the doors are removed from the vehicle after painting, in order to facilitate assembly of the doors, and then reinstalled to the respective vehicle further down the assembly line. This is an expensive and labor intensive process since the door must be installed to the vehicle twice. Further, the door assemblies then require a separate conveyor assembly line to move the doors through the assembly stations apart from the vehicle.

Additionally, the upper structural frame around the window, and the door body frame, and maybe even the exterior metal of the door, are often part of a unibody construction of the door, whereby the door body frame and window frame are formed from a single stamped part. The entire door and window frame is then mounted on the vehicle for assembly of the accessories and panels thereto. The installation of the window guides and/or seals is typically performed from inside the vehicle, thereby making the process difficult, due to space constraints and access to the components. Often, even the exterior mirror is secured to the door via fasteners from the interior side of the door. Additionally, the unibody construction of the doors is expensive to make or stamp as a single item.

Therefore, there is a need in the art for an improved process of assembling vehicle doors at the vehicle assembly plant or remote therefrom. The process should allow easy installation of various exterior accessories to a common frame, in order to avoid proliferation of parts within the vehicle or door assembly plant.

SUMMARY OF THE INVENTION

The present invention is intended to provide an exterior attachment or accessory module or sub-module or sub-assembly for a vehicle door which may comprise an exterior rearview mirror, a cap assembly, which may further include an exterior mirror body and/or a door handle, a window frame, window seals, and/or a movable window, fixed window and/or adjustable vent window. The exterior accessory module or assembly is easily mountable to an exterior mirror body mount that is on an exterior side of a door assembly or to a frame of a door assembly, such that the exterior mirror and/or cap assembly may be mounted to the door assembly at the vehicle assembly plant or elsewhere.

According to an aspect of the present invention, a modular door system for a vehicle is remotely assembled from a vehicle assembly plant. The modular door preferably includes a window, at least one hinge component, a door frame, a door handle and lock mechanism, and an exterior mirror body mount at an exterior side of the door assembly for mounting an exterior mirror body to the modular door assembly. The mirror body mount includes a first connecting portion which is connectable to a corresponding second connecting portion on the exterior mirror body, in order to secure the exterior mirror body to the modular door. Preferably, the first connecting portion includes an electrical connector for providing electrical connection to at least one electronic accessory within the exterior mirror body.

Preferably, the system includes an exterior mirror connecting assembly, which includes a first connecting portion at the exterior mirror body mount and a second connecting portion at the exterior mirror body. The first connecting portion is connectable to the second connecting portion to positively secure the exterior mirror body to the exterior mirror body mount of the door assembly from the exterior side of the door assembly.

According to another aspect of the present invention, an exterior mirror body assembly is mountable to a modular door. The modular door is remotely assembled from a vehicle assembly line and preferably includes a window, at least one hinge component, a door handle and lock mechanism, and a mirror body mount having a first connecting portion. The exterior mirror body assembly comprises a mirror housing, a reflective element adjustably retained within the mirror housing, and a second connecting portion. The second connecting portion is connectable to the first connecting portion to secure the exterior mirror body to the modular door. Preferably, the exterior mirror body assembly is mountable to the modular door on the vehicle assembly line. Preferably, the first and second connecting portions include corresponding electrical connectors for electronically connecting at least one electronic accessory of the exterior mirror body assembly to a vehicle wiring.

According to another aspect of the present invention, a vehicular modular door system for a vehicle comprises a door assembly for attaching to the vehicle and a cap assembly, which includes at least a portion of an exterior panel of the vehicle door. The door assembly includes a door frame, an external panel, at least one hinge member and a latch mechanism for releasably retaining the door frame in a closed position at the vehicle. The door frame includes a cap mounting portion. The cap assembly includes a connector for mounting the cap assembly to the cap mounting portion of the door frame. The cap assembly further includes an exterior rearview mirror and/or a handle assembly.

Preferably, the cap assembly includes an exterior rearview mirror, which may be engagable with an adjustment device of the door assembly, such that the exterior rearview mirror is adjustable from within the vehicle. The adjustment device may be electrical and/or mechanical. Preferably, the handle assembly is mechanically engagable with the latch mechanism of the door assembly as the cap assembly is attached to the door frame. The frame may comprise a metallic material, while the cap assembly comprises a polymeric material. Preferably, the cap assembly is attachable to the door frame via a snap-fit connection and/or a plurality of fasteners.

In one form, the door assembly further includes a movable window which is vertically adjustable via a window adjustment mechanism of the door assembly. The cap assembly includes a window seal for engaging the movable window of the door assembly as the window is raised and lowered within the door frame.

In another form, the cap assembly includes a movable window assembly which is insertable within the door frame and connectable to a window mechanism of the door assembly as the cap assembly is attached to the door frame.

Preferably, the door frame and door assembly are manufactured at a door manufacturing plant, while the cap assembly is manufactured remote from both the door manufacturing plant and the vehicle manufacturing plant. The cap assembly is attachable to the door frame at the door or vehicle manufacturing plant. Preferably, the cap assembly is colored to match an appropriate color of the door or trim of the vehicle.

According to yet another aspect of the present invention, a method of assembling a door assembly of a vehicle comprises the steps of assembling a door frame at a door manufacturing line or plant, assembling a cap assembly to the door frame at a vehicle assembly plant, and assembling the door frame to the vehicle at the vehicle assembly plant. The cap assembly may include an exterior rearview mirror assembly, a handle assembly, a window seal, and/or a movable window assembly.

According to another aspect of the present invention, a cap assembly for mounting to a door frame of a modular door assembly for a vehicle comprises a cap member and an exterior rearview mirror, a window frame portion, and/or a handle assembly. The modular door includes a mounting region along an upper portion of the door frame and may further include at least one hinge component, a latch mechanism for releasably retaining the door frame in a closed position at the vehicle, and a mirror adjustment device. The cap member is securable to the mounting region of the door frame. Preferably, the exterior rearview mirror and/or handle assembly are connectable to a connecting portion of the modular door assembly as the cap member is secured to the door frame. The connecting portion provides connection of the mirror assembly to the mirror adjustment device and of the handle assembly to the latch mechanism. In one form, the cap member comprises an upper cover which is attachable along the upper mounting portion of the door frame. In another form, the cap member comprises an outer door panel and is attachable to an outer surface of the door frame.

Preferably, the exterior rearview mirror is connectable to electrical connectors for electronically connecting at least one electronic component and/or accessory, such as an electronic mirror adjustment device, security lights, signal lights, or the like, of the exterior rearview mirror assembly to a vehicle wiring. Preferably, the modular door is remotely assembled from a vehicle assembly line, while the cap assembly is mountable to the modular door frame on the vehicle assembly line.

According to yet another aspect of the present invention, a vehicular modular door system comprises a door assembly for attaching to the vehicle and an exterior accessory assembly or module. The door assembly includes a door frame, at least one hinge member and a mounting portion. The exterior assembly includes at least one connector for mounting the exterior assembly to the mounting portion of the door assembly and at least one of an exterior rearview mirror, a cap member extending over an upper portion of the door assembly, and a window frame.

In one form, the exterior assembly comprises the exterior rearview mirror and is connectable to a mirror mount at the door assembly. In another form, the exterior assembly comprises the cap member, which further includes an exterior rearview mirror and/or a door handle, and is mountable along an upper portion of the door assembly. Preferably, the exterior assembly is connectable to the mounting portion of the door assembly via mechanical and electrical connectors which mount the exterior assembly to the door assembly and which provide power and/or control to one or more accessories of the exterior assembly, such as a mirror actuator, a security light, or the like. Optionally, the exterior assembly may include the window frame, which may further include one or more seals and/or a fixed and/or movable window and associated tracks. The frame and seals extend at least partially around a perimeter edge of the window or windows associated with the door assembly and/or the exterior assembly.

Preferably, the door frame and door assembly are manufactured at a door manufacturing line, while the exterior assembly is manufactured remote from both the door manufacturing line and the vehicle manufacturing line. The exterior assembly is attachable to the door frame at the door or vehicle manufacturing line. Preferably, the exterior assembly is colored to match an appropriate color of the door or trim of the vehicle.

According to another aspect of the present invention, a method for assembling a vehicle door comprises assembling a door module or assembly at a door assembly line, providing an exterior assembly, and assembling the exterior assembly to the door assembly at either the door assembly line or a vehicle assembly line. The door assembly includes a frame, a panel, at least one hinge member, a latch mechanism and a mounting portion at the door frame. The exterior assembly includes a cap member, a door handle, an exterior rearview mirror assembly, a window frame, a window seal, a fixed window and/or a movable window. The exterior assembly is mountable to the mounting portion of the door frame while the door handle, exterior rearview mirror assembly, and/or movable window are connected to corresponding connectors of the door assembly.

Preferably, prior to assembling the exterior assembly to the door assembly, the method includes providing the door assembly to a vehicle assembly line and assembling the door assembly to the vehicle at the vehicle assembly line. The exterior assembly is then assembled to the door assembly at the vehicle assembly line.

Therefore, the present invention provides for improved manufacturing of doors for various applications of common door frames. The present invention provides an exterior accessory module or assembly, such as an exterior rearview mirror assembly and/or a cap or cover assembly, which is attachable to a portion of the door panel or door frame and is preferably colored to match an appropriate cover or trim color of the vehicle door. The exterior cap assembly may include a door handle, exterior rearview mirror assembly and/or window assembly, which may further include the window tracks, seals and frame for a movable and/or fixed window of the door, which are connectable to the appropriate electrical and/or mechanical devices of the door frame as the exterior or cap assembly is secured to the door frame. The door assembly may then be manufactured as a common door, and the exterior assembly, or rearview mirror assembly or cap assembly, may be snapped onto the door at the vehicle assembly line or at a just-in-time facility, and thus accommodate different options, such as exterior rearview mirror options and door handle options, for the vehicle. Additionally, the exterior assembly may include at least a portion of an exterior panel of the door, which may be the last item or component installed to the door or the first item removed from the door for service. The present invention thus enhances both the assembly and service processes, because the exterior panel provides access to the components of the door from the exterior side of the door. The exterior assembly of the present invention thus provides improved assembly and service processes at the vehicle assembly plant and reduces the number of parts required to mount the various components/accessories to the door of the vehicle.

These and other objects, advantages, purposes and features of this invention will become apparent upon review of the following specification in conjunction with the drawings.

BRIEF DESCRIPTION OF THE DRAWINGS

FIG. 5 is a sectional view taken along the line V-V in FIG. 3;

FIG. 6 is a sectional view similar to FIG. 5 of a cap assembly of the present invention being mounted to an alternate door frame design;

FIG. 7 is a perspective view of a cap assembly of the present invention which includes an exterior rearview mirror mounted toward an end thereof;

FIG. 11 is a perspective exploded view of an accessory module and door assembly in accordance with the present invention;

FIG. 12 is a perspective view of a mirror module useful with the accessory module of FIG. 11;

FIG. 17 is a cross sectional view of a door handle assembly taken along the line XVII-XVII in FIG. 16;

DESCRIPTION OF THE PREFERRED EMBODIMENTS

Figure 1:
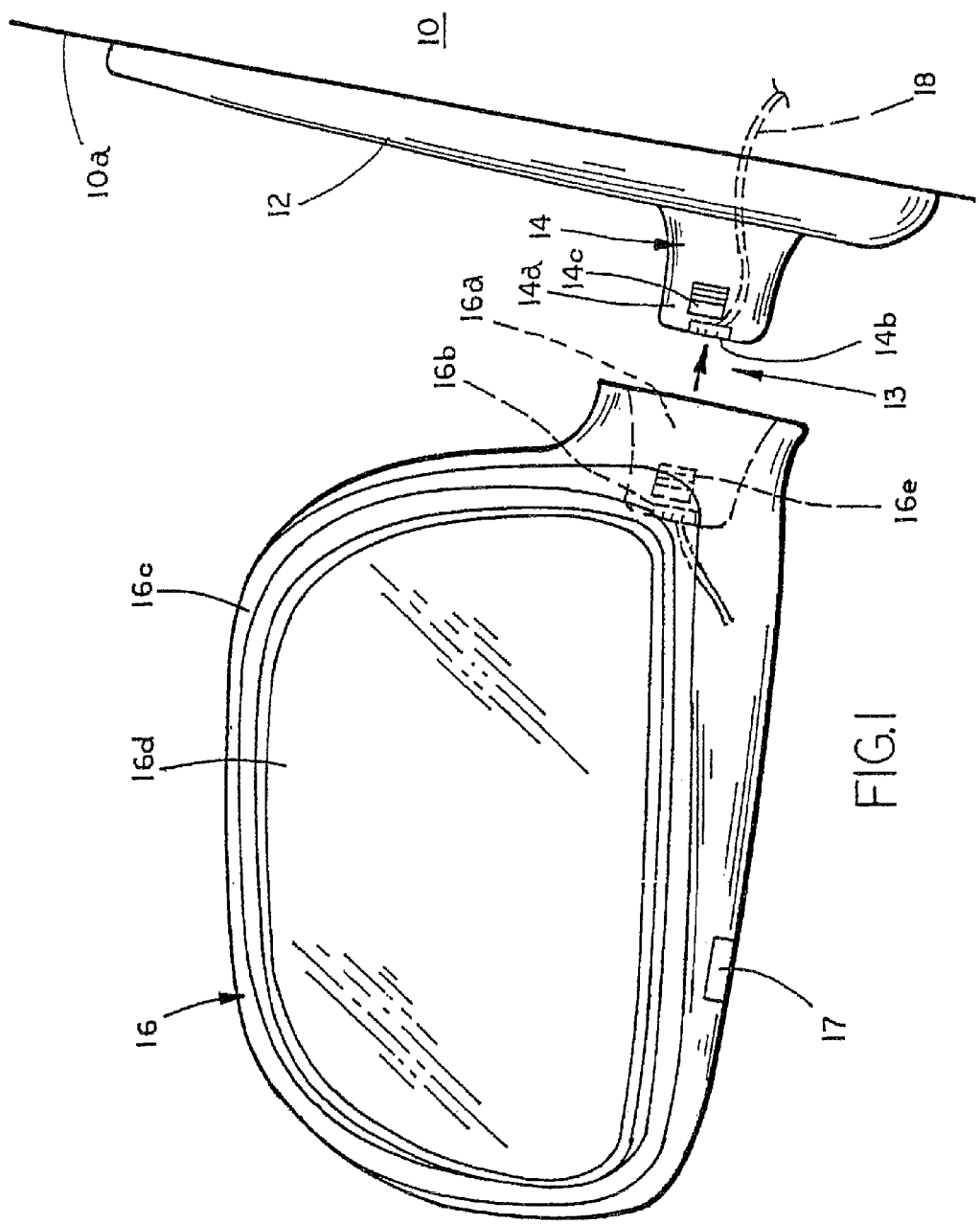
FIG. 1 is a view of an exterior rearview mirror, looking forwardly toward a front of a vehicle having a modular door in accordance with the present invention.

Referring now specifically to the drawings, and the illustrative embodiments depicted therein, a vehicle door module 10 is mounted to a vehicle (not shown) and includes a mirror body mount 14 on an exterior side 10a of modular door 10 (FIG. 1). An exterior accessory module or assembly, such as exterior mirror head or body 16, is connectable to body mount 14. Mirror body 16 and mirror body mount 14 are correspondingly formed for easy connection of mirror body 16 to body mount 14 after modular door 10 is assembled and, more preferably, after modular door is installed on the vehicle at the vehicle assembly plant. Preferably, the door assembly includes an exterior mirror connecting assembly or system 13, which includes a connecting portion or element 14a at mirror body mount 14 and a connecting portion or element 16a at mirror body 16, whereby mirror body 16 is mountable to body mount 14 via connection of the respective connecting portions from an exterior side of the vehicle door assembly. The body mount 14 preferably includes a connecting portion 14a which snaps or otherwise easily attaches to a correspondingly formed connecting portion 16a of mirror body 16. Preferably, connecting portions 14a and 16a include correspondingly formed electrical connectors or elements 14b and 16b to facilitate easy connection of one or more electronic accessories 17 within mirror body 16 to a wiring 18 which is connected to a door wiring harness (not shown) within door module 10. Most preferably, electrical connectors 14b and 16b are integrally molded within their respective connecting portions to provide substantially rigid current carriers molded within the plastic connecting portions.

Modular door 10 may be manufactured remotely from a vehicle assembly plant, such as at a door manufacturer assembly plant or the like, and shipped as a single unit to the vehicle assembly plant for installation onto a vehicle body as the body travels along the assembly line. Modular door 10 may include one or more door accessories, such as windows, window control mechanisms, handles, lock mechanisms, regulators, interior and exterior trim components, interior or exterior lights, audible sources such as speakers, and/or the like. Modular door 10 may further include interior controls or switches, such as controls for power windows, power locks, power seats, power mirrors, interior cabin climate or temperature settings and the like. Modular door 10 further includes a door wiring harness (not shown) and/or a door electrical/electronic distribution network for electronically connecting the electronic components and accessories of modular door 10 to a vehicle wiring (not shown) within the vehicle.

Modular door 10 preferably includes mirror body mount 14 on a sail or trim piece 12 on its exterior side 10a. Mirror body mount 14 protrudes outwardly from sail 12 or side 10a for mounting mirror 16 thereto. Mirror body mount 14 may be painted to match the body color of the vehicle, or may be black or trim colored. Mirror body mount 14 includes connecting portion 14a, which is preferably a snap fit type connector for snapping or otherwise fixedly securing within a receiving connecting portion 16a of mirror body 16. For example, as shown in FIG. 1, connecting portion 14a may be a male connector which may include tabs or arms 14c for engaging corresponding slots or openings 16e in a female connecting portion 16a to positively secure mirror body 16 to body mount 14 on modular door 10. Preferably, mirror body mount 14 further includes electrical wiring connector 14b for connecting to corresponding connector 16b on mirror body 16 to provide electrical power and/or control to one or more accessories 17 within mirror body 16.

Mirror body 16 comprises a housing 16c and a reflective element 16d adjustably positioned within housing 16c. Connecting portion 16a is preferably formed within housing 16c and correspondingly formed to receive or otherwise engage connecting portion 14a of body mount 14 therein. Preferably, connecting portion 16a receives mounting connecting portion 14a therein and snaps or otherwise positively secures to body mounting portion 14 to retain mirror body 16 to modular door 10 of vehicle 12. Although shown and described as a male and female type connector, the scope of the present invention clearly includes mirror body 16 and body mount 14 connecting via any other known means, such as one of the components including multiple push pins or tabs or the like extending to engage corresponding receiving portions or openings in or on the other component. It is further envisioned that the mirror body 16 may otherwise be secured to body mount 14 by one or more screws, fasteners, snaps or the like, without affecting the scope of the present invention.

Mirror body 16 may further include electrical connector 16b which is engagable with electrical connector 14b on body mount 14 as mirror body 16 is affixed to body mount 14, in order to provide power and control to the electrical accessory or accessories 17 of the mirror body 16. Preferably, connectors 14b and 16b are conventional multi-pin plug and socket connectors which plug or telescope together to positively secure the door wiring 18 to one or more mirror wirings within the mirror head or body 16. Most preferably, the connectors are fixedly secured within the respective connecting portions 14a and 16a, such that as mirror body 16 is snapped or otherwise affixed to body mount 14, the electrical connectors 14b and 16b are also snapped together. However, the electrical wirings may be any known electrical wiring means, such as data wires, a plurality of individual wires, or the like and may be connected individually or by any known connecting means, such as other terminal connectors or by clamping or crimping the wires together or the like, without affecting the scope of the present invention.

Preferably, modular door 10 includes a mirror body mount having a standard mounting or connecting portion which is implementable on many different modular doors for different applications. The mirror body 16 then may be provided with a corresponding standard mounting or connecting portion, such that the mirror body may be mountable on modular doors for different vehicles or applications, thereby lessening parts proliferation of mirror heads within the mirror manufacturer assembly plants and mounts or mounting portions within the modular door assembly plants. The electrical connectors 14b and 16b would likewise preferably be uniformly applied, standard connectors, such as multi-pin, plug and socket type connectors or the like.

Figure 2:
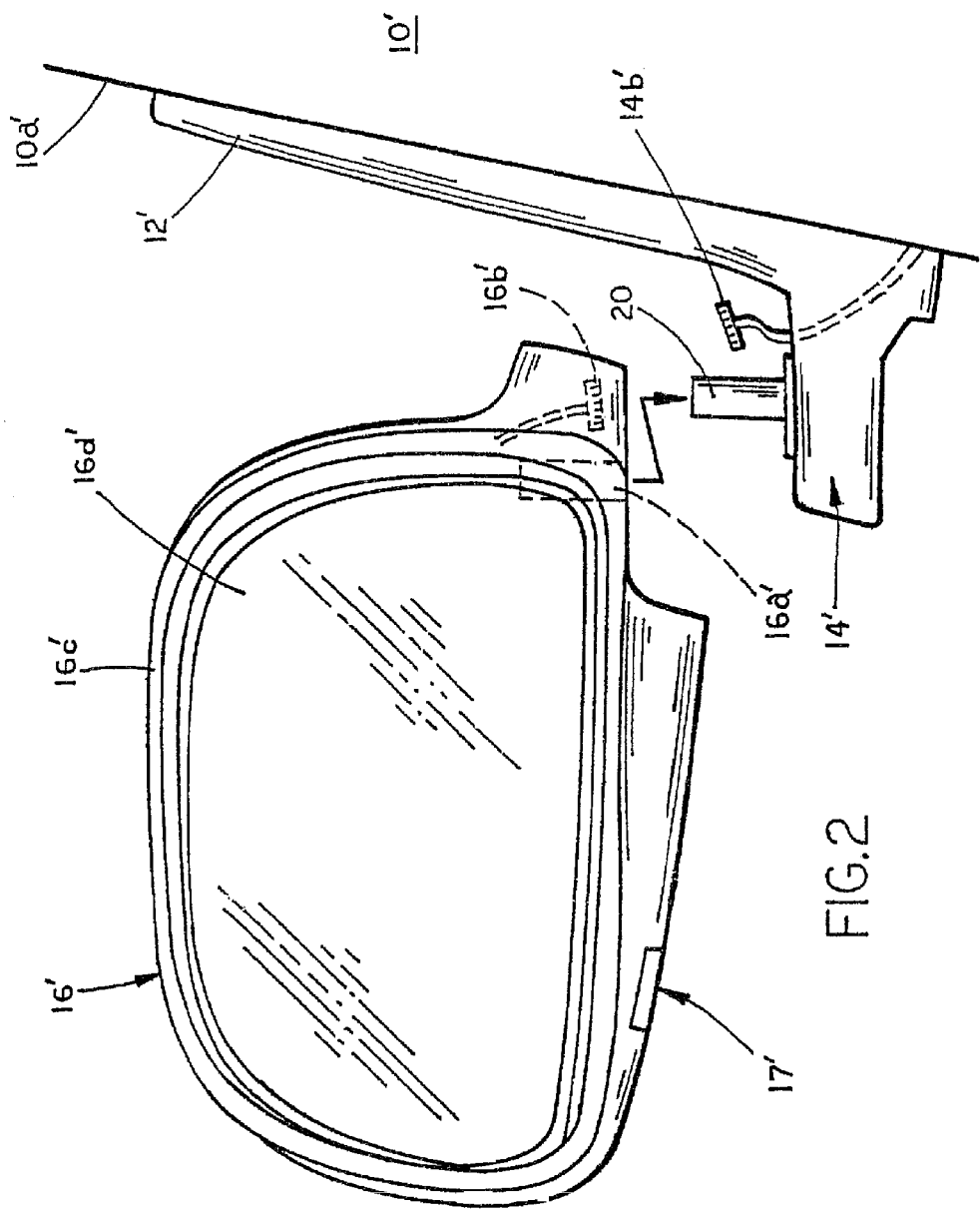
FIG. 2 is a view similar to FIG. 1 of a foldable mirror assembly for mounting to a modular door on a vehicle
Figure 3:
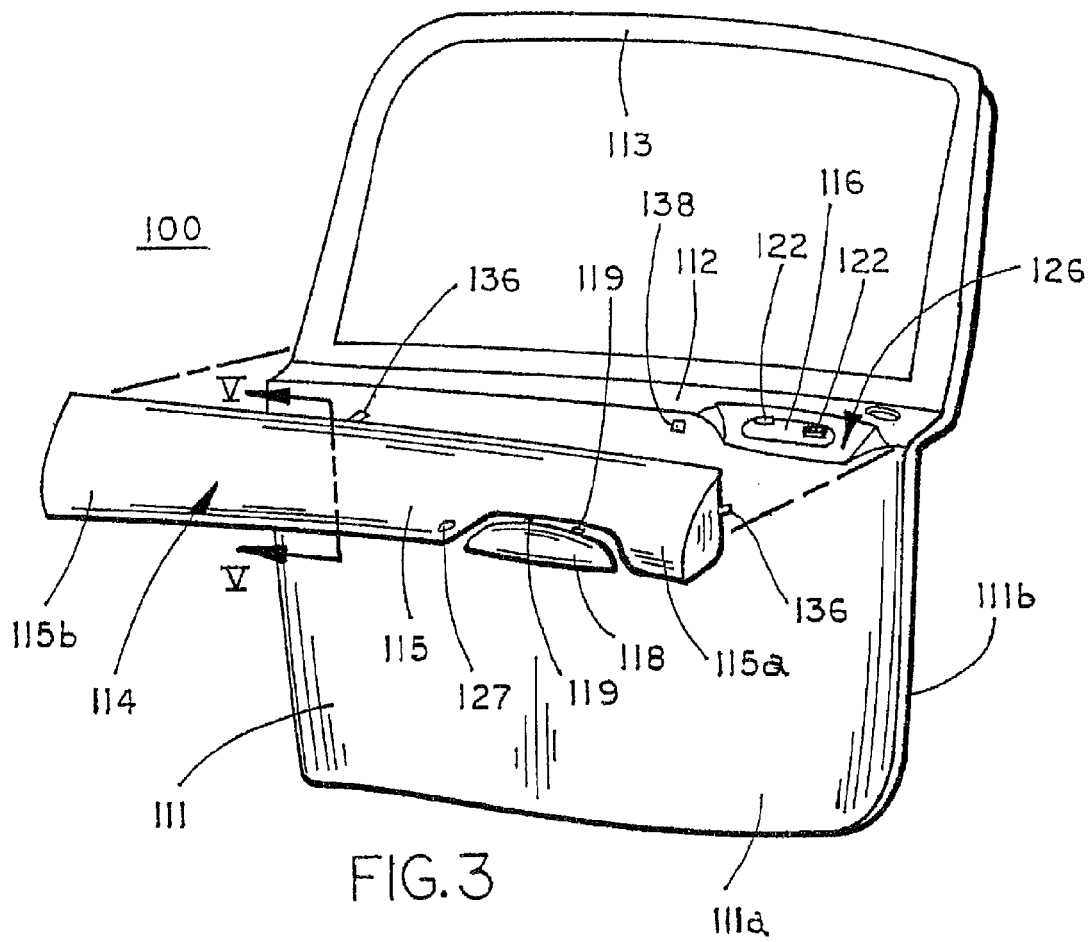
FIG. 3 is an exploded perspective view of a cap assembly and door frame in accordance with the present invention.

Referring now to FIG. 2, an exterior mirror body 16' may be a folding mirror, such that the mirror body portion 16' is pivotally mounted to a body mounting portion 14' on a sail or trim piece 12' or on an exterior side 10a' of a modular door 10' and is pivotable relative to the vehicle between an operative position and a folded position. Similar to mirror body 16 discussed above, mirror body 16' comprises a housing 16c' and a reflective element 16d' adjustably positioned within housing 16c'. Body mount 14' may include a spindle or shaft 20, which is rotatably received within mirror body 16' as mirror body 16' is affixed to body mount 14'. The shaft 20 may include locking tabs or the like to rotatably engage a corresponding passageway 16a' of mirror body 16' and substantially preclude removal of mirror body 16' relative to body mount 14', while allowing relative rotation therebetween. Shaft 20 may alternately be included within or extending from housing 16c' of mirror body 16' and engage a correspondingly formed passageway in body mount 14', without affecting the scope of the present invention.

Mirror body 16' may further include one or more electrical accessories 17'. Accordingly, mirror body 16' may include an electrical element or connector 16b' and wiring for electrical connection to a corresponding element or connector 14b' at body mount 14'. Optionally, and preferably, the wiring can be in the form of substantially rigid electrical conducting pathways (such as formed from metal stampings or the like) that are integrally molded, as is known in the molding arts, into the structure of the mirror body 16' and/or the body mount 14'. Similar to electrical connectors 14b and 16b, discussed above, electrical connectors 14b' and 16b' may be any known electrical connecting means, such as conventional multi-pin plug and socket connectors or the like.

Mirror body 16' may be a powerfold mirror, and may include an electronic powerfold mirror actuator (not shown) within housing 16c'. The actuator may be a conventional actuator, as is well known in the automotive mirror art. The actuator may be actuated from within the vehicle and is operable to engage a portion of spindle 20 or body mount 14' to cause mirror body 16' to pivot relative to body mount 14'. Alternately, the actuator or motor may be mounted within mirror body mount 14' on modular door 10' and be operable to engage a portion of mirror body 16', without affecting the scope of the present invention. Although shown and described as mirror body 16' or body mount 14' including a spindle which is received on the other component, clearly other pivotable attaching means may be implemented, such as a portion of a hinge member being positioned on the mirror body 16' with a corresponding second portion of the hinge on the mirror body mount 14', without affecting the scope of the present invention. The hinge members may snap together or be connected by a hinge pin or the like, or by any other known means. The actuator may be positioned on either the mirror body 16' or the mirror body mount 14' in applications where the mirror is a powerfold mirror.

Mirror head or body 16 or 16' may include one or more electronic accessories 17 or 17', such as reflective element positioning devices or systems, such as disclosed in commonly assigned U.S. Pat. No. 5,796,176, issued to Kramer et al., the disclosure of which is hereby incorporated herein by reference, lights, such as turn signals or security lights, such as disclosed in U.S. Pat. No. 5,371,659, filed Feb. 1, 1993 by Pastrick et al., U.S. Pat. No. 5,497,306, filed Apr. 21, 1995 by Pastrick, U.S. Pat. No. 5,823,654, filed Jul. 26, 1996 by Pastrick et al., and U.S. Pat. No. 5,669,699, filed Jan. 8, 1996 by Pastrick et al., the disclosures of which are hereby incorporated herein by reference, and as disclosed in commonly assigned, U.S. patent application Ser. No. 09/102,414, filed Jun. 22, 1998 by Pastrick et al., now U.S. Pat. No. 6,176,602, and Ser. No. 09/335,010, filed Jun. 17, 1999 by Pastrick et al., now U.S. Pat. No. 6,276,821, the disclosures of which are hereby incorporated herein by reference, variable electrochromic reflective elements, such as disclosed in commonly assigned U.S. Pat. No. 5,659,423, issued to Schierbeek et al., the disclosure of which is hereby incorporated herein by reference, exterior temperature sensors, cameras or sensors, such as disclosed in commonly assigned U.S. Pat. No. 5,670,935, issued to Schofield et al., the disclosure of which is hereby incorporated herein by reference, or the like. In situations where a powerfold mirror is implemented, mirror body 16' may further include an electronic motor for pivoting mirror body 16' relative to body mount 14', such as a conventional powerfold actuator, or an actuator of the type disclosed in commonly assigned, U.S. patent application Ser. No. 09/408,867, filed Sep. 29, 1999 by Whitehead, now U.S. Pat. No. 6,243,218, the disclosure of which is hereby incorporated herein by reference. The electronic accessories are connectable to the vehicle wiring through one or more connectors within mirror body 16 or 16'. Each of the connectors are connectable to corresponding connectors in the mirror body mount 14 or 14', which is further connected to the vehicle wiring via door wiring harness 18. Preferably, mirror body 16 or 16' includes a single standard connector 16b or 16b', which engages a corresponding standard connector 14b or 14b' in body mount 14 or 14', respectively. A mirror wiring or harness (not shown) then connects each accessory to connector 16b or 16b'.

Providing the mirror head as a separate component from the modular door facilitates easier shipment of the modular door to the vehicle assembly plant, since the mirror head no longer protrudes outwardly from the modular door. The mirror head may be shipped directly to the vehicle assembly plant and installed to the mirror mount after the modular door is affixed to the vehicle. However, the mirror head may be shipped to the modular door manufacturer and installed to the door prior to shipment, without affecting the scope of the present invention. The mirror head or body and body mount may be painted to match the vehicle color or may be black depending on the application.

Figure 4:
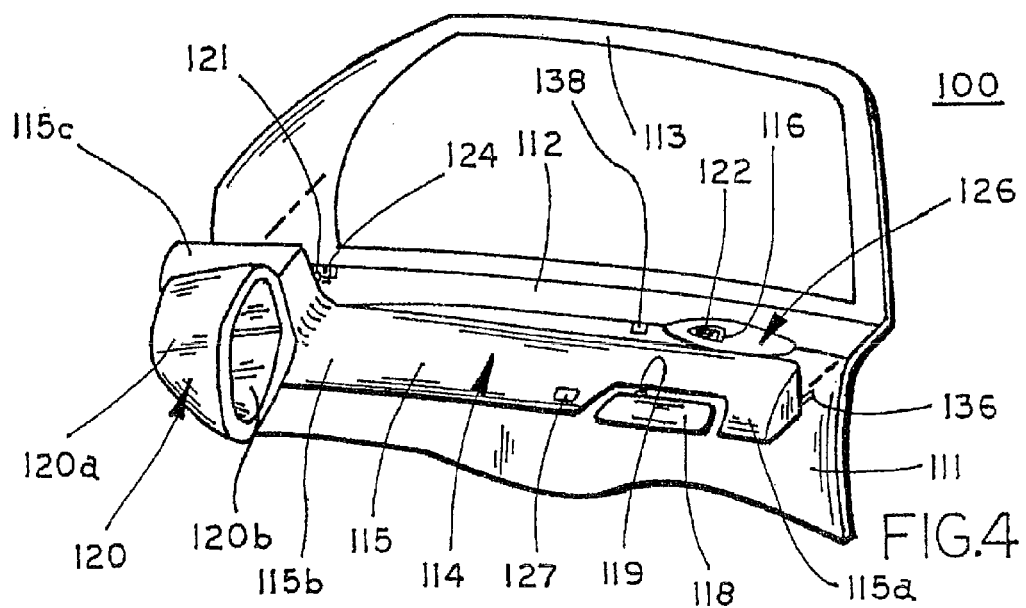
FIG. 4 is an exploded view similar to FIG. 3, with the cap assembly including an exterior rearview mirror and a door handle.
Figure 8A:
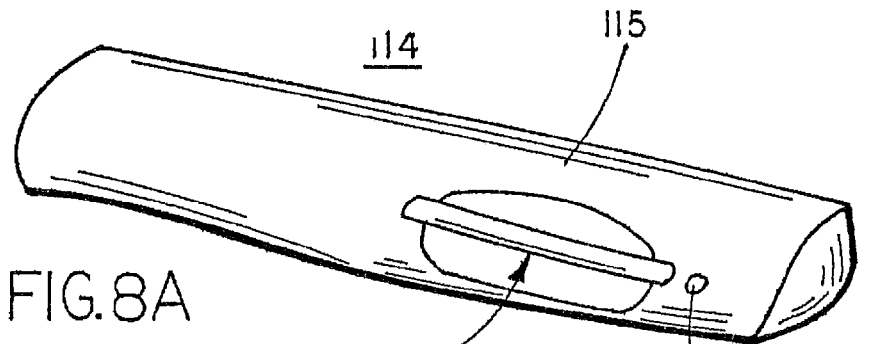
FIGS. 8A-8C are perspective views of alternate embodiments of cap assemblies having different door handle components.
Figure 8B:
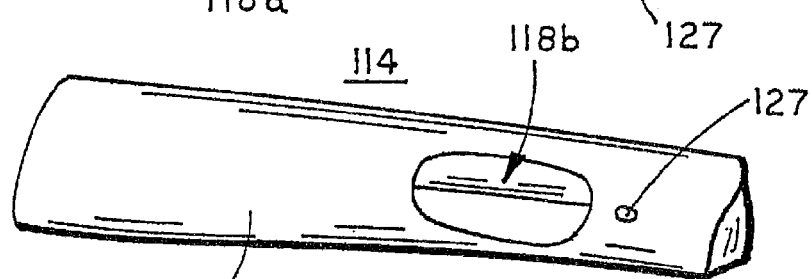
Figure 8C:
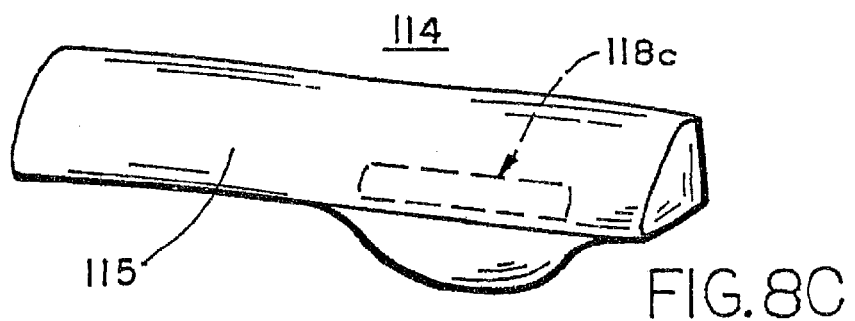
Figure 8D:
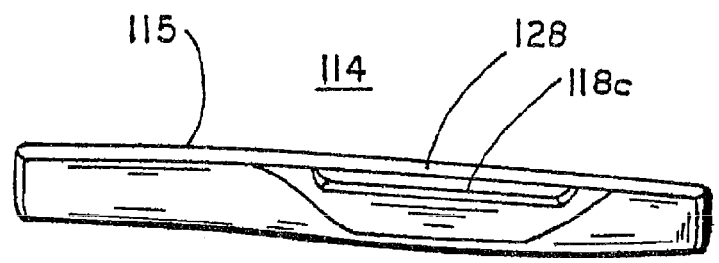
FIG. 8D is a lower plan view of the cap assembly of FIG. 8C.
Figure 9:
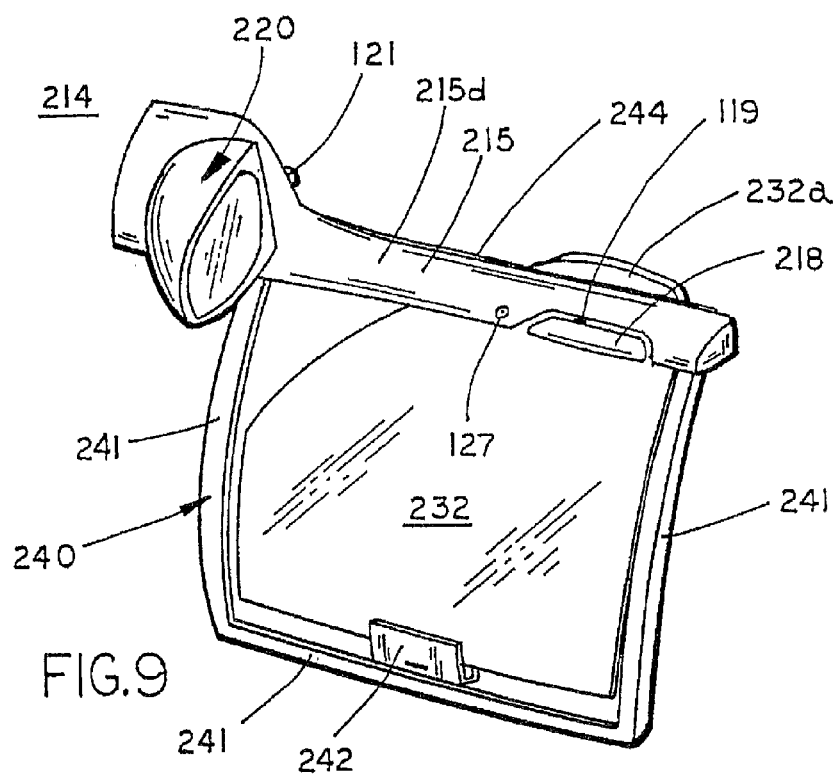
FIG. 9 is a perspective view of another cap assembly of the present invention, which includes a door handle, an exterior rearview mirror, and a movable window assembly.
Figure 10:
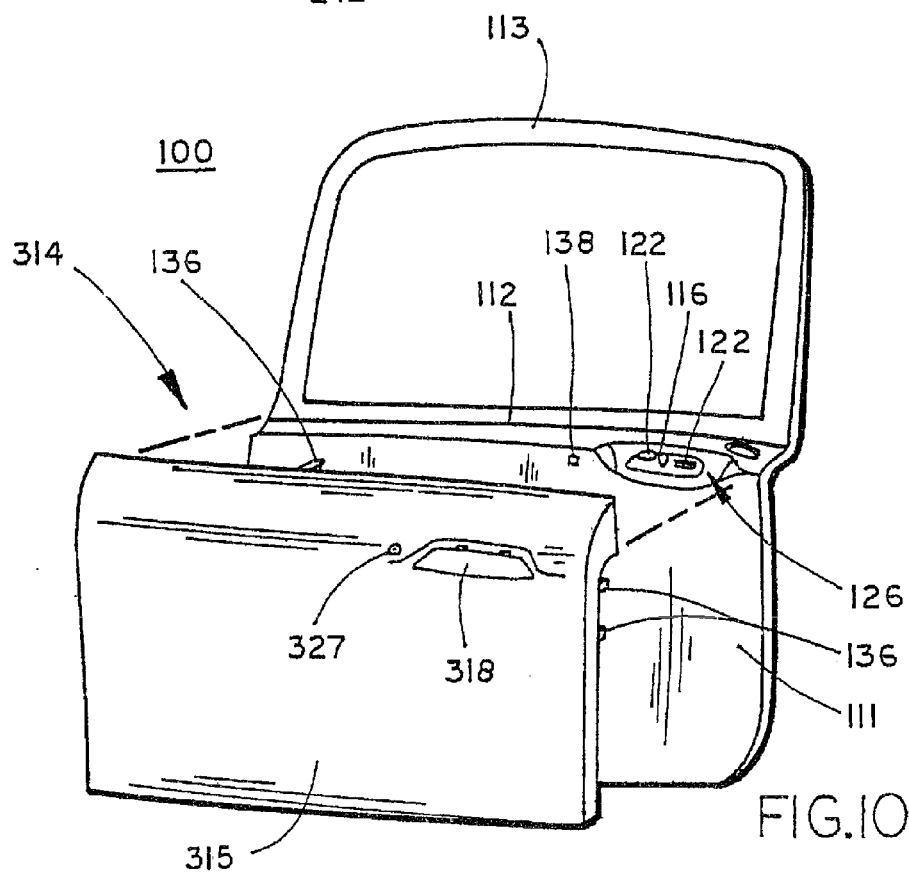
FIG. 10 is an exploded perspective view similar to FIG. 3 of another cap assembly embodiment, which provides an exterior door panel for the door assembly.

Referring now to FIGS. 3-10, a modular door assembly 100 includes a door frame 111 (FIGS. 3 and 4) and is mountable to a vehicle (not shown). The modular door frame 111 includes a mounting region 112 for receiving an accessory module or cap assembly 114 thereon. Cap assembly 114 includes a cap member 115, which is securable to mounting region 112 of door frame 111 via any known fastening means, and may be formed to fit over various forms or shapes of mounting regions. Cap member 115 extends along an upper region of the door frame and provides at least a portion of an exterior surface or panel of the door. Cap member 115 may be colored to match an appropriate panel or trim color of the door and/or vehicle. Cap assembly 114 further includes a door handle 118, which is pivotable or movable to open the door of the vehicle from outside the vehicle, and/or an exterior rearview mirror assembly 120 (FIG. 4). It is further envisioned that cap assembly 114 may include an exterior rearview mirror assembly 120, but no door handle (FIG. 7). Such a cap assembly may be implemented on doors with door handles positioned lower on the door panels or above the cap assembly, such as the window frame along the rear perimeter edge of the door window. As cap member 115 is secured to mounting region 112 of door frame 111, door handle 118 is mechanically connectable to a door latch mechanism or linkage 122 within door frame 111, while exterior mirror 120 may be connectable to a mirror adjustment mechanism and/or to an electrical wiring of modular door frame 111, as discussed below. As shown in FIG. 10, a cap assembly 314 may include a cap member 315 which covers the entire door exterior as an exterior panel of the door, without affecting the scope of the present invention. Cap assembly 314 may further include a door handle 318, lock cylinder 327 and/or an exterior mirror assembly.

The door frame 111 and door module assembly may be manufactured remotely from a vehicle assembly plant, such as at a door manufacturer assembly plant or the like, and shipped as a single unit to the vehicle assembly plant for installation onto a vehicle body as the body travels along the assembly line. Modular door frame 111 comprises a metal frame structure or an engineering plastic frame for the modular door, and includes a perimeter window frame 113 extending upwardly from cap mounting region 112 to provide a perimeter seal around upper and side edges of a window 132 (FIGS. 5 and 6) of the modular door. An external skin or panel (not shown), such as sheet metal or polymeric door panel, is attached to an outer portion 111a of frame 111, while an interior panel (also not shown) and other trim components are attached to an interior portion 111b of frame 111. The modular door may also include one or more door accessories, such as hinged windows, window control mechanisms, lock mechanisms or devices 138, latch mechanisms 122, regulators, interior and/or exterior trim components, interior and/or exterior lights, audible sources, such as speakers, and/or the like. Additionally, the door may further include interior controls or switches, such as controls for power windows, power locks, power seats, power mirrors, interior cabin climate or temperature settings and the like. The door preferably includes a door wiring harness (not shown) and/or a door electrical/electronic distribution network for electronically connecting the electronic components and accessories of the door to a vehicle wiring (not shown) within the vehicle.

Latch mechanism 122 of door frame 111 is connected to the door locks and latches and is preferably accessible at a passageway 116 at cap mounting region 112. Passageway 116 is positioned at a recess 126 in cap mounting region 112 and provides access to the door latch mechanisms 122 such that door handle 118 of cap assembly 114 may be easily connected to door latch mechanisms or linkages 122 as cap member 115 is secured to cap mounting region 112 of door frame 111. Recess 126 provides clearance for door handle 118 to be moved or pivoted to open the door assembly 100 of the vehicle. As shown in FIG. 4, door frame 111 may further include a mirror or accessory connector 124 positioned toward a forward region of cap mounting region 112. Accessory connector 124 may provide electrical and/or mechanical connection to cap assembly 114 and/or exterior rearview mirror assembly 120 as cap member 115 is attached to cap mounting region 112 of door frame 111, as discussed below.

Cap member 115 preferably comprises a polymeric material, and may include a plurality of mechanical connectors 136 extending from an inner surface thereof. The mechanical connectors may be similar to conventional push or snap-fit connectors, such as Christmas tree connectors or the like, which are engagable with a plurality of corresponding holes or openings in door frame 111 such that cap member 115 may be fixedly secured to door frame 111 by pressing the connectors through the openings and snapping the cap assembly to the door frame. The fasteners of cap assembly 114 may be integrally molded with the cap member to provide a single component, thereby reducing the number of parts at the door assembly plant. In applications of cap assembly 314, the fasteners or connectors 136 may be positioned around a perimeter of the door panel 315 and/or at various locations within the perimeter to secure the door panel 315 of cap assembly 314 to door frame 111.

Door handle 118 of cap assembly 114 is pivotably or movably mounted at a rearward end 115a of cap member 115. Door handle 118 includes an attaching portion 119, which is connectable to latch mechanism 122 through passageway 116. Preferably, attaching portion 119 provides a snap together or similar quick connection of door handle 118 to latch mechanism 122 as cap member 115 is mounted to mounting region 112 of door frame 111. Cap assembly 114 may also include a lock cylinder or locking device 127 which is connectable to the locking mechanism 138 of the modular door assembly 110 as cap member 115 is mounted to door frame 111. The lock cylinder or locking/unlocking device allows for a person to unlock the door of the vehicle from outside the vehicle, and may comprise a mechanical key lock and/or an electrical keypad or the like. It is further envisioned that the locking device may comprise a solenoid operable mechanism or electrical locking/unlocking mechanism, and may include an automatic lock/unlock system that utilizes recognition of a transducer carried by an approaching operator and unlocks the door in response to such recognition. The locking device may optionally include a user recognition authorization system or device, which is operable to unlock the vehicle door in response to verification or identification of the user at the door, such as via recognition of the user's finger print(s), thermal profile, voice or the like.

Exterior mirror assembly 120 is mounted to a forward end 115b of cap member 115. Exterior rearview mirror assembly 120 comprises a housing 120a and a reflective element 120b adjustably positioned within housing 120a. Mirror housing 120a may be fixedly or pivotally secured to cap member 115 and may be color matched with the cap member to provide a finished appearance to the cap assembly and to the modular door when the cap assembly is secured to the modular door frame 111. Preferably, cap member 115 includes a raised trim piece or sail 115c at its forward end, such that mirror assembly 120 is attached at sail 115c. Sail 115c then provides a finished appearance to the door as cap assembly 114 is secured to door frame 111, such that sail 115c covers a forward portion of door frame 111. Mirror assembly 120 may be a folding mirror such that the mirror body or housing 120a is pivotally mounted to the sail 115c of cap assembly 114 and is pivotable relative to the vehicle between an operative position and a folded position, as is known in the art.

Similar to mirror body 16 or 16', discussed above, mirror assembly 120 may include one or more electronic accessories, such as reflective element positioning devices or systems, such as disclosed in commonly assigned U.S. Pat. No. 5,796,176, issued to Kramer et al., the disclosure of which is hereby incorporated herein by reference, lights, such as turn signals or security lights, such as disclosed in U.S. Pat. No. 5,371,659, filed Feb. 1, 1993, by Pastrick et al., U.S. Pat. No. 5,497,306, filed Apr. 21, 1995, by Pastrick, U.S. Pat. No. 5,823,654, filed Jul. 26, 1996, by Pastrick et al., and U.S. Pat. No. 5,669,699, filed Jan. 8, 1996 by Pastrick et al., the disclosures of which are hereby incorporated herein by reference, and as disclosed in commonly assigned, U.S. patent application Ser. No. 09/102,414, filed Jun. 22, 1998, by Pastrick et al., now U.S. Pat. No. 6,176,602, and Ser. No.

09/335,010, filed Jun. 17, 1999, by Pastrick et al., now U.S. Pat. No. 6,276,821, the disclosures of which are hereby incorporated herein by reference, variable electrochromic reflective elements, such as disclosed in commonly assigned U.S. Pat. No. 5,659,423, issued to Schierbeek et al., the disclosure of which is hereby incorporated herein by reference, exterior temperature sensors, cameras or sensors, such as disclosed in commonly assigned U.S. Pat. No. 5,670,935, issued to Schofield et al., the disclosure of which is hereby incorporated herein by reference, and/or the like. In situations where a powerfold mirror is implemented, the mirror assembly 120 may further include an electronic motor for pivoting mirror body 120a relative to cap member 115, such as a conventional powerfold actuator or an actuator of the type disclosed in commonly assigned U.S. patent application Ser. No. 09/408,867, filed Sep. 29, 1999 by Whitehead, now U.S. Pat. No. 6,243,218, the disclosure of which is hereby incorporated herein by reference.

Preferably, cap assembly 114 further includes one or more mechanical and/or electrical elements or connectors or connecting portions 121, which are preferably a snap-fit type connector for snapping or otherwise fixedly securing to the accessory connector 124 of door frame 111. For example, connecting portion 121 may be a male connector, which may include tabs or arms for engaging corresponding slots or openings in a female connector 124, in order to positively secure the adjustment device of mirror assembly 120 to door frame 111. Accessory connector 124 may include a mechanical mirror adjustment device, such as a cable or the like, which may connect to a corresponding device within cap assembly 114 and/or mirror assembly 120 to allow mechanical adjustment of reflective element 120b of the mirror assembly from within the vehicle. Where applicable, the accessory connector 124 of door frame 111 and connector 121 of cap assembly 114 may include electrical wiring and connectors to provide electrical power and/or control to electrical components and/or accessories within mirror assembly 120 and/or cap assembly 114.

Preferably, door frame 111 includes standard and/or common mounting or connecting portions for both the mirror assembly or accessory connector 124 and the door latch linkages 122 which are implementable on many different door frames for different applications. Cap assembly 114 may be provided with corresponding standard mounting or connecting portions, such that the cap assemblies may be mountable on modular doors for different vehicles or applications, thereby reducing the number of different cap assemblies, door handles, and/or mirror assemblies within the cap assembly and/or door manufacturer assembly plants. Accessory connector 124 may be connected to a vehicle wiring (not shown) via a door wiring harness (also not shown) in door frame 111. A mirror wiring or harness (not shown) then connects each accessory of cap assembly 114 to the standard connector 121 of cap assembly 114. Optionally, and preferably, the wiring may be in the form of substantially rigid electrical conducting pathways (such as formed from metal stampings or the like) that are integrally molded, as is known in the molding arts, into the structure of the mirror housing 120a, the cap member 115, and/or the door frame 111. Alternately, the electrical connectors may be any known electrical connecting means, such as conventional multi-pin, plug and socket type connectors or the like, which plug together to positively secure a door wiring to one or more wirings within the mirror assembly 120 or elsewhere within the cap assembly 114. Most preferably, the connectors are fixedly secured to the cap assembly such that as the cap assembly is snapped or otherwise secured to door frame 111, the electrical connectors are also snapped together. However, the electrical wirings may be any other known electrical wiring means, such as data wires, a plurality of individual wires, or the like, and may be connected individually or by any known connecting means, such as via other terminal connectors or by clamping or crimping the wires together or the like, without affecting the scope of the present invention.

Cap assembly 114 may further include a window seal 130 (FIGS. 5 and 6) for engaging an exterior surface 132a of a movable window 132 of the modular door. Window seal 130 may extend along an upper edge 115d of cap member 115, as shown in FIG. 5. Alternately, window seal 130 may extend along upper edge 115d of cap member 115, and may further seal or connect to an upper edge 112a of mounting region 112 of door frame 111 (FIG. 6). Preferably, window seal 130 is molded onto upper edge 115d, but may be otherwise secured, such as by clips or adhesive, without affecting the scope of the present invention. As shown in FIGS. 5 and 6, cap member 115 may be modified to receive various seal and door frame designs, without affecting the scope of the present invention.

As shown in FIGS. 8A-8D, cap assembly 114 may include various door handle designs, such as a door strap handle 118a (FIG. 8A), a paddle type handle 118b (FIG. 8B), or a hidden or partially covered/enclosed handle 118c (FIGS. 8C and 8D), or any other type of door handle. The cap assembly for the hidden handle 118c includes a cover or housing 128 extending over door handle 118c at recess 126 of the door frame.

Referring now to FIG. 9, a cap assembly 214 may include a cap member 215, a door handle 218, a mirror assembly 220, and a movable window insert or cassette 240. The movable window cassette 240 preferably includes a window guide or frame 241 extending downwardly from cap member 215 and generally surrounding a movable window 232 when the movable window is lowered to a lowered position. Window cassette 240 may be inserted within a modular door frame and secured therein, such that movable window 232 is vertically adjustable within the modular vehicular door. Preferably, movable window 232 includes a connecting mechanism or member 242, which is connectable to a window adjustment mechanism (not shown) within the modular door frame, such that the movable window 232 may be raised and lowered from within the vehicle via an electrical or mechanical device, as known in the art. Cap assembly 214 further includes a window seal 244 extending along an upper edge 215d of cap member 215. Window seal 244 engages an outer surface 232a of movable window 232 as movable window 232 is vertically adjusted relative to cap member 215 and the vehicle door.

Similar to mirror body or head 16 or 16', discussed above, providing the cap assembly with a mirror and/or handle as a separate component from the modular door facilitates easier shipment of the modular door to the vehicle assembly plant, since the mirror head no longer protrudes outwardly from the modular door. The cap assembly with mirror head may be shipped directly to the vehicle assembly plant and installed to the door frame after the modular door is affixed to the vehicle. This may be performed after the internal components and external panels and/or trim have been attached to the door frame. However, the cap assembly may be shipped to the modular door manufacturer or integrator and installed to the door prior to shipment, without affecting the scope of the present invention. The cap member, handle, and/or mirror head or body may be painted to match the vehicle color or may be black or other trim color depending on the particular application.

Referring now to FIGS. 11 and 12, a vehicle door assembly 400 includes an exterior accessory module or assembly 410, which is mountable to a vehicle door frame 412 and further includes a cap or cover member 415, an exterior mirror head 420 and sail 419, a door handle 418 and a lock cylinder or locking device 427, and a window trim or frame portion 450. Exterior assembly 410 preferably further includes a pair of window tracks 452 extending downwardly from cap member 415 which guide a movable window 432 therealong. Preferably, exterior assembly 410 further includes the seals for sealing the window 432 relative to cap member 415 and frame 450, as discussed below.

Exterior assembly 410 is mountable to door frame 412 from an exterior side of the frame, while one or more interior components, assemblies, cassettes, or modules 454 are mounted to the door frame 412 from an interior side of the door frame. The interior assemblies 454 may include various components or accessories, such as speakers, motor mechanisms, door mechanisms, controls, side airbag units, and/or the like, and may further include an interior trim panel for covering the interior surface of the door assembly 400. An exterior door panel 456 may be mounted to door frame 412 adjacent to or immediately below cap member 415. Door frame 412 comprises a stamped unibody frame, which includes a window frame portion 413. A window raising/lowering mechanism or regulator 458 may be provided or installed within frame 412 for raising and lowering the movable window 432 along guides or tracks 452 of module or assembly 410. The window may be movable via an electronic movable mechanism or a mechanical mechanism. Alternately, or additionally, the exterior assembly 410 may include a fixed window and/or an adjustable vent window, without affecting the scope of the present invention.

Preferably, exterior assembly 410 includes the seals for engaging and sealing the movable window along opening 415$f$ at cap member 415, and further along and within window frame 450 and guides 452 of exterior assembly 410. The seals (not shown) along opening 415$f$ may be conventional window seals or the like, or may be similar to seals 130 discussed above (but on both the exterior and interior sides of the window) and may be secured to cap member 415 or may be molded therewith, such as via a two shot molding process or the like. Similarly, the seals (also not shown) along frame 450 of exterior assembly 410 may be secured within a channel formed by frame 450, or may be molded with exterior assembly 410, without affecting the scope of the present invention. The frame and seals thus extend at least partially around a perimeter edge of the movable window when the movable window is at least partially closed.

Door handle 418 may be any type of door handle, such as a paddle type handle, a strap handle or the like, and is movably mounted to cap member 415 and connectable to a latch mechanism (not shown) within the door assembly 400 as cap member 415 is mounted to door frame 412. Door handle 418 may be positioned at a lower portion 415$e$ of cap member 415, such that cap member 415 may be a narrow trim panel or strip, yet is wide enough to receive door handle 418 at the lower portion 415$e$. The door handle 418 and lower portion 415$e$ of cap member 415 are received within a recessed portion 412$d$ of door frame 412 when exterior assembly 410 is mounted to door frame 412. The locking device 427 may be a lock cylinder, a keypad, a solenoid operated device or other means for locking/unlocking the door latch, as discussed above with respect to locking device 127.

As exterior assembly 410 is mounted to the door frame 412, guides or channels 452 of exterior assembly 410 are preferably inserted through corresponding openings 412$a$ at either end of a slot 412$c$ along an upper portion 412$b$ of frame 412, and slide along the edges of movable window 432 until cap member 415 seats against upper portion 412$b$, whereby a slot 415$f$ along an upper region 415$d$ of cap member 415 is generally aligned with slot 412$c$ of door frame 412. Cap member 415 and frame 450 are then affixed to door frame 412 and window frame 413, preferably via a snap fit connection, such as via multiple connectors (not shown) at cap member 415 and frame 450 being inserted into and thus protruding through and securing within corresponding openings or apertures 460 in door frame 412 and window frame 413, respectively. Alternately, it is envisioned that the window frame portion 450 of exterior assembly 410 may provide the structural frame of the window region as well, such that the door frame 412 would not have to include the window frame portion 413. The exterior assembly would then provide the rigid window frame of the door and the seals and channels for the window of the door and mount to an upper portion of a door body frame. Such a frame assembly is equally applicable to doors with movable and/or fixed windows. Preferably, as discussed above with respect to cap assembly 115, as cap member 415 is secured to frame 412, the mechanical and/or electrical connecting portions of door handle 418, lock 427 and/or mirror 420 are correspondingly connected to appropriate connectors at or within door frame 412.

Exterior assembly 410 is thus mounted to door frame 412 from outside the vehicle to improve the assembly processes of vehicle doors over conventional processes. The exterior module or assembly 410 may be mounted to frame 412 at the vehicle assembly plant as the vehicle and door frame travel along the vehicle assembly line, or may be mounted to door frame 412 at a modular door manufacturer or door integrator plant, such as at a just-in-time (JIT), in sequence plant or line nearby the vehicle assembly plant or line. The exterior accessory module or assembly provides an integrated window, mirror and/or door handle assembly that is mechanically and/or electrically connectable to or loadable into the door frame or door module at the integrator's plant or line. The exterior assembly may include one or more electronic devices, such as lights, such as ground illumination lights, turn signal lights, side lights, running board lights (if the exterior assembly includes the outer door panel and a running board along a lower edge thereof) or other illumination sources, similar to those discussed above with respect to mirror head 16 or mirror assembly 120 of cap assembly 114. The lights may be incandescent lights, light emitting diodes (LEDs) or other illumination sources, without affecting the scope of the present invention. As discussed above, exterior module or assembly 410 snaps or otherwise connects to door frame 412 such that both mechanical and electrical connections are made to the door frame and appropriate components or wirings/harnesses. The present invention thus provides mechanical, electrical, seal, window, exterior mirror and/or door handle management to the integrator of the vehicle door assembly.

Optionally, the exterior panel 456 may be mounted to frame 412 in a similar manner as exterior assembly 410, or may be included as a lower portion of cap member 415, similar to cap assembly 314 discussed above, such that a single exterior cover assembly 410 is snapped or otherwise secured to door frame 412 to provide the entire exterior surface and trim of the door assembly 400. Also, exterior assembly 410 may optionally include a mirror mount or footer (not shown), such that a separate mountable mirror assembly 420' (FIG. 12) may be snapped or otherwise secured to the footer at the vehicle assembly plant. This provides improved packaging of the door assembly for transporting the door to the vehicle assembly plant, since the mirror is not attached until later and, thus, does not extend outwardly from the side of the door. The mirror assembly 420' may include a sail portion 419' and/or a mirror head 420a' which is securable to exterior assembly 410 and/or door frame 412. Exterior mirror 420 or 420a' may be a fixed mirror, a breakaway mirror, a folding mirror, such as a powerfold mirror which is electrically adjustable, such as of the type disclosed in commonly assigned, U.S. patent application Ser. No. 09/408,867, filed Sep. 29, 1999 by Whitehead, now U.S. Pat. No. 6,243,218, which is hereby incorporated herein by reference, or the like, and may include one or more electrical accessories and/or mechanical adjustment devices, similar to mirror head 16, discussed above. Likewise, the connecting portions for the mirror head and the mount or footer at the exterior assembly and/or frame are similar to those discussed above with respect to mirror head 16 and mirror mount 14.

Figure 13:
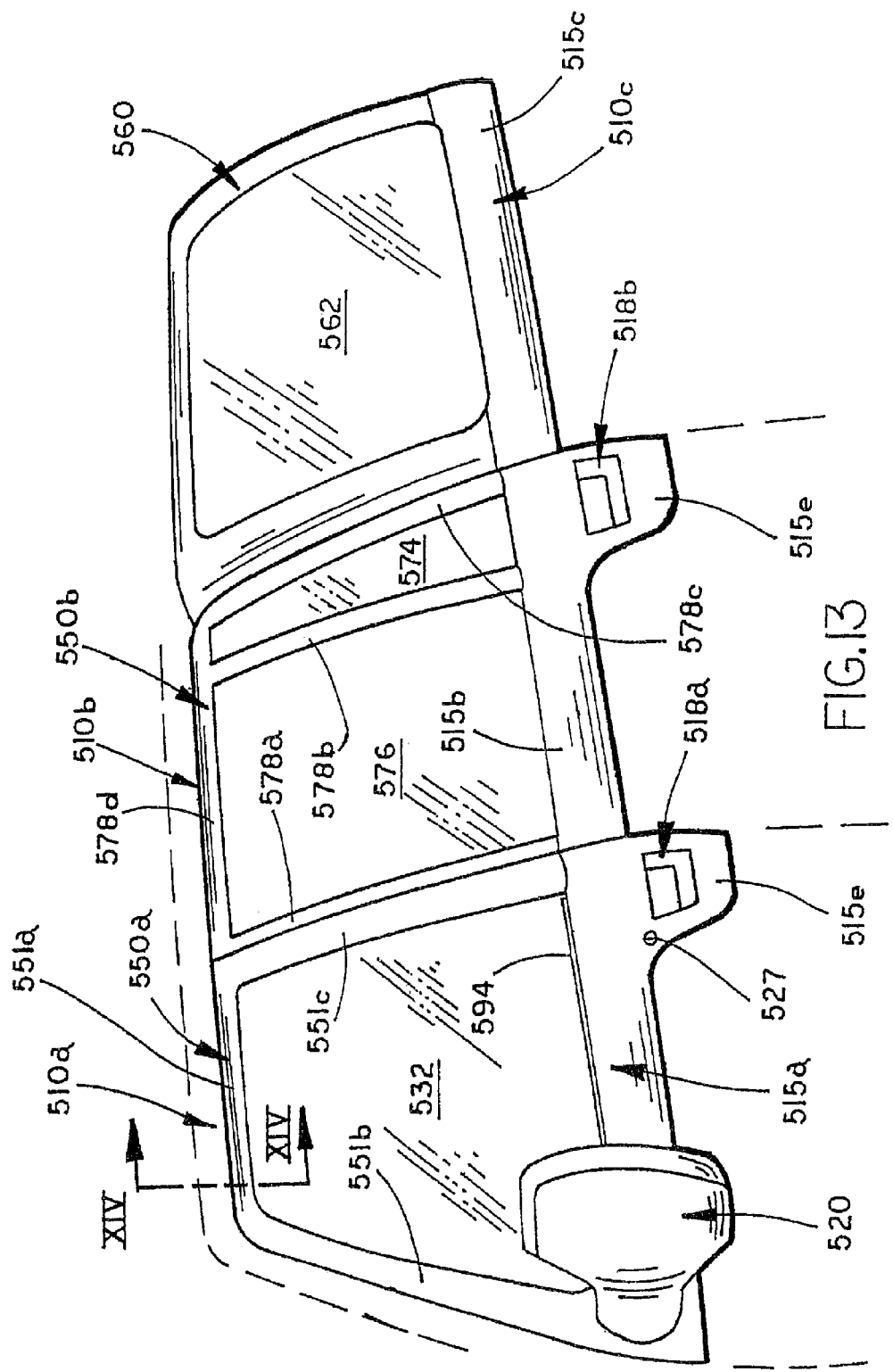
FIG. 13 is a perspective view of accessory modules for use along the front and rear doors and the sides of a vehicle.
Figure 15:
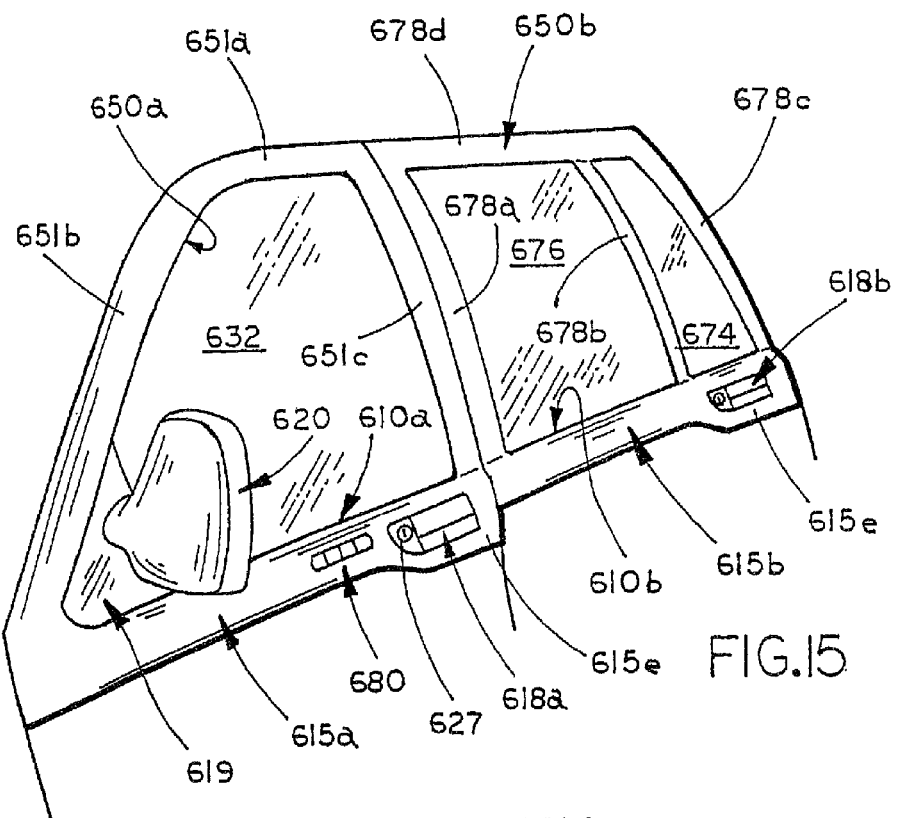
FIG. 15 is a perspective view similar to FIG. 13 of another embodiment of the present invention.
Figure 16:
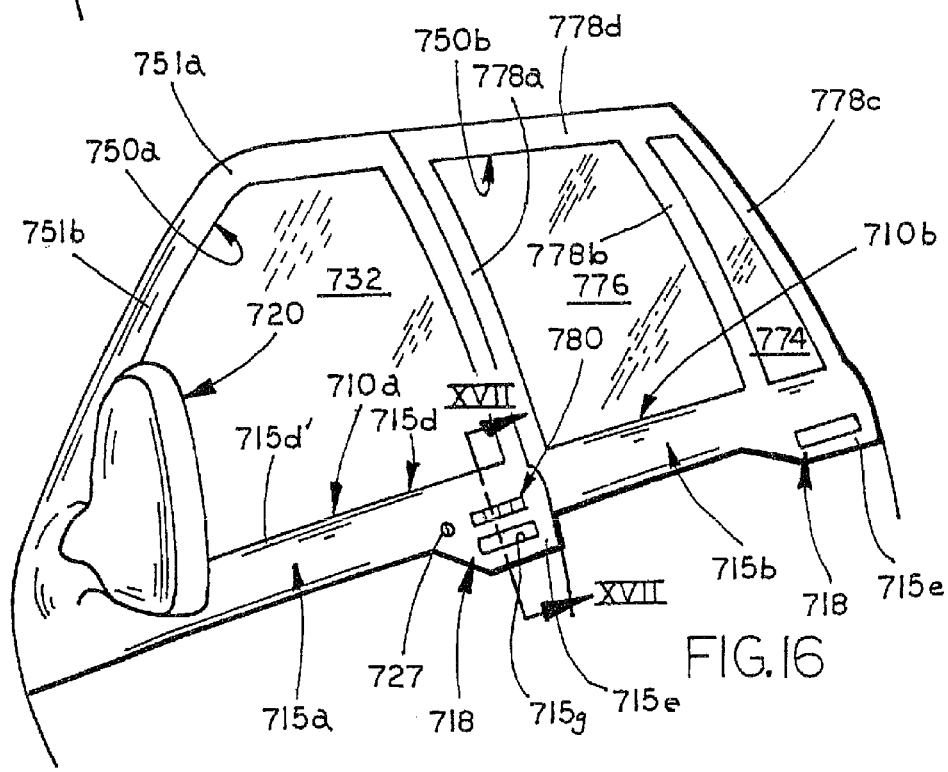
FIG. 16 is a perspective view similar to FIGS. 13 and 15 of yet another embodiment of the present invention.

As shown in FIGS. 13, 15 and 16, the exterior module or assembly of the present invention may be applied to a front door, a rear door with a movable window and a fixed window, and/or a rear panel of a vehicle, such as for a station wagon or a sport utility vehicle or the like. Each of the exterior assemblies 510, 610 and 710 are substantially similar to exterior assembly 410, discussed above, such that a detailed description of each assembly will not be repeated herein. Similar elements of the exterior assemblies have therefore been labeled with similar reference numerals to exterior assembly 410, with an appropriate prefix (for example 510, 610 or 710) added to the numbers.

Figure 14:
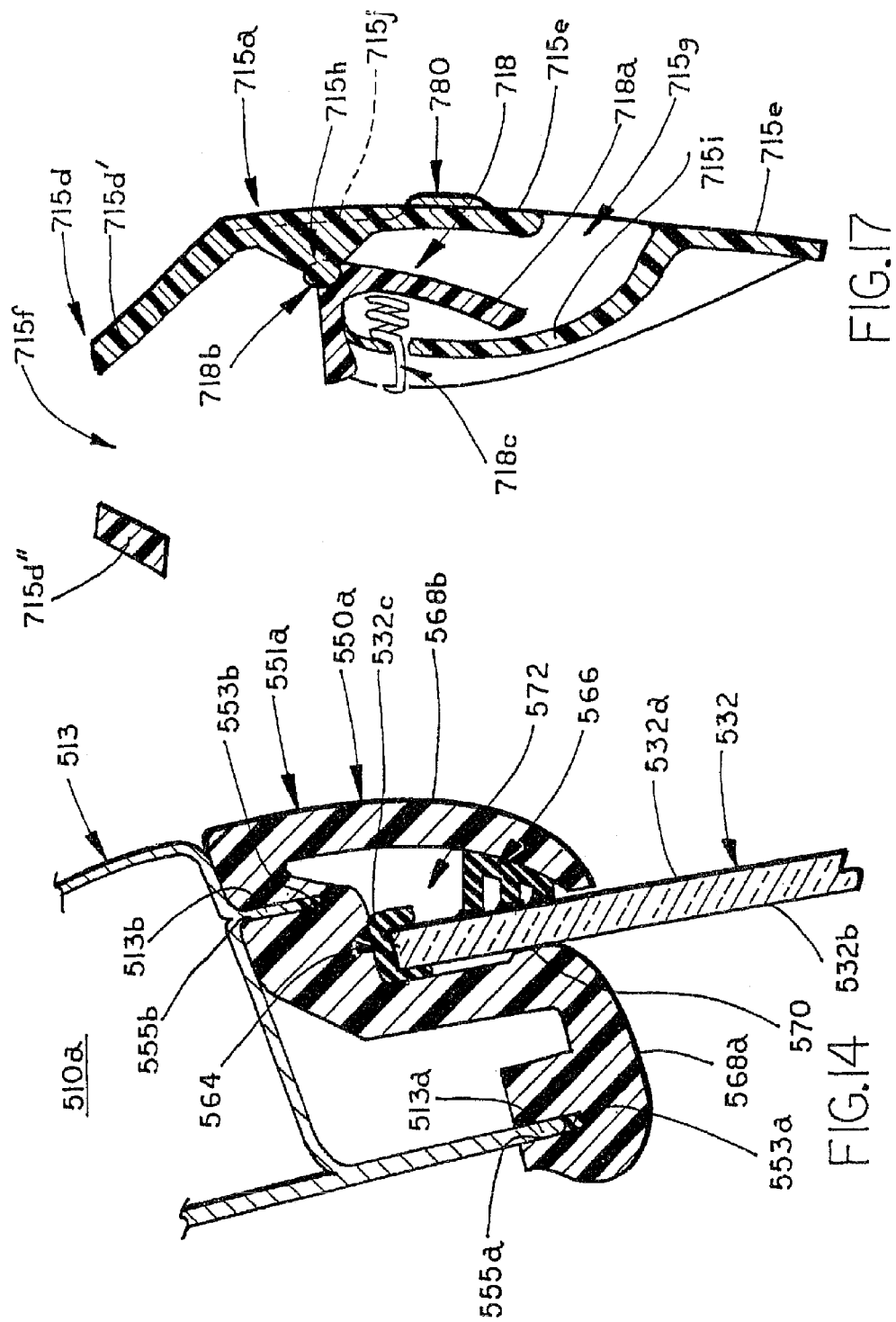
FIG. 14 is a cross sectional view of the window seals and frame of the present invention taken along the line XIV-XIV in FIG. 13.

Referring to FIGS. 13 and 14, a front door exterior module 510a may include an exterior mirror 520, a door handle 518a, and/or a locking device 527. The module 510a may comprise a cap member 515a and may further include an upper, window frame portion 550a which includes an upper portion 551a, a forward leg portion 551b and a rearward leg portion 551c. Additionally, frame portion 550a preferably includes one or more window seals for the movable window to slidably engage as the window is raised and lowered between an opened and closed position.

As shown in FIG. 14, upper portion 551a of frame portion 550a may be connected to a window frame 513 of a door frame via engagement of one or more slots 555a, b with corresponding flanges or extensions 513a, b of window frame 513. Preferably, a compressible seal 553a, b is provided within slots 555a, b to seal the frame portion 550a to the door frame. Upper frame portion 551a is formed to engage the flanges and provide a lower, interior surface 568a and an outer trim surface 568b around the metal of the door frame. Exterior assembly 510a may thus be installed by aligning and engaging the slots 555a, b with flanges 513a, b and then pressing the cap member 515a onto the upper portion of the door frame (not shown in FIG. 13), whereby connectors at cap member 515a may engage with and secure to corresponding openings or connectors at the door frame, until the cap member and thus exterior assembly 510a is secured to the door frame.

Preferably, as shown in FIG. 14, the window seals for upper portion 551a of frame portion 550a of exterior assembly 510a comprise an upper, compressible seal 564 and an outer, multi-finger or multi-lip seal 566 which slidably engages an outer surface 532a of movable window 532 as the movable window is raised to its closed position. Upper portion 551a further includes a guide portion 570 which extends partially into a channel 572 formed in upper portion 551a for receiving movable window 532 therein as window 532 is closed. Accordingly, as movable window 532 is raised toward its closed position, an inner surface 532b of window 532 engages guide portion 570, which guides movable window 532 into channel 572. Window 532 is thus aligned with channel 572 and engages outer seal 566. Outer seal 566 flexes as it slidably engages outer surface 532a of window 532 to substantially seal window 532 relative to frame portion 550a of exterior assembly 510a. As the window is raised further, an upper edge 532c of window 532 engages and compresses compressible seal 564 at an upper end of the channel 572. Similarly, other seals (not shown) are provided along the forward and rearward leg portions 551b, 551c, to provide slidable engagement with outer surface 532a of movable window 532, thereby sealing window 532 relative to exterior assembly 510a and thus the door assembly. Additionally, a pair of seals 594 are provided at either side of a slot in an upper portion of cap member 515a. Movable window 532 is movable through the slot such that the interior and exterior sides of the window slidably engage a respective one of the lower seals along the cap member 515a. Clearly, other means for sealing the movable window along the upper and side portions 551a, 551b, 551c of frame portion 550a, and/or along the cap member 515a, may be implemented to slidably seal the movable window relative to the frame portion 550a, without affecting the scope of the present invention.

Similarly, a rear door exterior module 510b, which is separate from module 510a and rear panel cap assembly 510c, may be mounted to a rear door frame (not shown) and comprise a cap member 515b and window frame portion 550b, and may include a rear door handle 518b (FIG. 13). Rear door module 510b may include a fixed window 574 and a movable window 576, which are separated by a guide member or divider 578b of window frame portion 550b. Window frame portion 550b also includes a forward leg member 578a, a rear leg member 578c and an upper member 578d, which at least partially surround the fixed and movable windows of exterior assembly or module 510b. Preferably, exterior module 510b includes the window seals (not shown) for both windows and is formed around fixed window 574 to substantially secure and seal the fixed window to the vehicle when module 510b is installed at the appropriate rear door of the vehicle. The frame 550b, divider 578 and associated seals may be substantially similar to frame 550a, discussed above, and/or to known frame and seal designs, or may be similar to those disclosed in commonly assigned, U.S. patent application Ser. No. 09/611,727, filed Jul. 7, 2000 by Davis et al. for VEHICLE WINDOW ASSEMBLY, now U.S. Pat. No. 6,220,650, the disclosure of which is hereby incorporated herein by reference. Optionally, the frame may comprise a two piece or "clamshell" type of frame which is securable together around the fixed window and associated seals, as discussed below with respect to FIGS. 18-22. Rear door exterior assembly 510b is preferably mounted to the rear door frame in a similar manner as exterior assembly 510a or exterior assembly 410.

Additionally, a rear panel cap assembly 510c, which is separate from front and rear door exterior modules 510a and 510b, may be provided along a rear panel or portion of the vehicle, as shown in FIG. 13, Rear cap assembly 510c includes a cap member 515c, and may further include an upper, window frame portion 560 formed in one-piece with cap member 515c, which encases and seals a fixed window 562 and/or vent window (not shown) at the rear portion of the vehicle. Accordingly, the present invention may provide a generally continuous trim portion or panel extending along the doors and side of a vehicle. Similar to exterior assembly 410, the separate exterior assemblies 510a, 510b and 510c are preferably secured to the respective portions of the door frames or vehicle frame from an exterior side thereof via a snap fit connection, whereby the mechanical and electrical connections are made for the various components as the assemblies are snapped or otherwise secured to the frames of the doors and/or vehicle.

Referring now to FIG. 15, a front door exterior assembly 610a and a rear door exterior assembly 610b, which is separate from front door exterior assembly 610a, may be mounted to a front and rear door frame (not shown), respectively. Front exterior assembly 610a is substantially similar to exterior assembly 510a, discussed above. Front exterior assembly 610a includes a sail portion 619, which may include exterior mirror 620 or may include a mirror mount or footing (not shown), at which a separate mirror head and/or sail is mounted in a manner similar to mirror head 16 and mirror mount 14 or mirror 420', discussed above. Mirror 620 may be a fixed mirror, a breakaway mirror or a power folding mirror, as discussed above with respect to mirror head 16, without affecting the scope of the present invention.

Cap member 615a of exterior assembly 610a includes a keypad 680, which is operable to unlock the door in response to the appropriate sequence of numbers or characters being touched or pressed at the keypad, as is known in the art. The electrical connection of keypad 680 to a door wiring harness (not shown) is provided in a similar manner as discussed above with respect to cap assembly 114, such that the electrical connection of keypad 680 (and any other electrical accessories included in exterior assembly 610a, such as lights, actuators, electrochromic devices and the like of mirror 620, or lights or the like for door handle 618a and/or lock 627) is made to corresponding connectors at the door frame (which, in turn, are connected to the door wiring and to the vehicle wiring) as the exterior assembly is mounted or snapped to the door frame.

Rear door exterior assembly or module 610b is substantially similar to assembly 510b, discussed above, and includes a cap member 615b, a door handle 618b, and an upper, window frame and seal portion 650b, which substantially surrounds and encases a movable window 676 and a fixed window 674. Window frame portion 650b includes a front leg portion 678a, a divider or guide member 678b, a rear leg portion 678c and an upper portion 678d. Each of the portions 678a, 678b, 678c and 678d of window frame portion 650b, and an upper portion 615c of cap member 615b, include appropriate seals for engaging and sealing movable window 676 and/or fixed window 674 relative to exterior assembly 610b. As discussed above, the seals may be of known designs, or may be similar to the seals of exterior assembly 510b, or may be similar to the frame and seals disclosed in commonly assigned, U.S. patent application Ser. No. 09/611,727, filed Jul. 7, 2000 by Davis et al. for VEHICLE WINDOW ASSEMBLY, now U.S. Pat. No. 6,220,650.

Another embodiment of an exterior assembly according to the present invention is shown in FIGS. 16 and 17 and includes a front door exterior assembly 710a and a rear door exterior assembly 710b, which is formed separately from front door exterior assembly 710a. The cap members 715a, 715b and window frame portions 750a, 750b are substantially similar to the cap members and window frame portions discussed above with respect to exterior assemblies 410, 510a, 510b, 610a and 610b, such that a detailed discussion will not be repeated herein. Cap member 715a of front door exterior assembly 710a includes a lower region 715e which provides an opening or aperture 715g therethrough. A keypad 780 is also positioned at lower region 715e, such as above opening 715g, as shown in FIG. 16. As seen in FIG. 17, the door handle 718 comprises a paddle portion 718a and a pivot axle 718b, and is positioned interiorly of lower portion 715e of cap member 715a and within a cavity defined by lower portion 715e and an interior wall 715i of cap member 715a. Pivot axle 718b of handle 718 is pivotably mounted at an interior handle mounting portion 715h of lower portion 715e of cap member 715a, such that paddle 718a pivots about pivot mount 715h as paddle 718a is pulled outwardly by a person opening the vehicle door. Handle 718 further includes a connecting portion 718c, such as a spring or hook, which extends from an inner side of paddle 718a and protrudes through interior wall 715i of cap member 715a. The connecting portion 718c is preferably formed for easy connection, most preferably a snap together type connection, with a mechanical door latch mechanism or linkage (not shown) within the vehicle door, whereby pivotal movement of paddle 718a causes a corresponding movement of the latch mechanism or linkage to release the latch and open the vehicle door.

As shown in FIG. 17, keypad 780 may be positioned at an outer surface of lower portion 715e of cap member 715a, such that electrical connections 715j to the keypad are preferably routed or molded within cap member 715a to a connecting portion (not shown) of the cap member. Preferably, all of the electrical accessories included in exterior assembly 710a are connected, either via wiring harnesses or electrical connectors molded within cap member 715a, to one or more electrical connectors at an interior surface of exterior assembly 710a, such as along cap member 715a. The electrical connector (or connectors) preferably provides a snap connection or plug/socket connection, such as a multi-pin plug or socket or the like, to a corresponding plug or socket at the door assembly.

As best seen from FIG. 17, an upper portion of cap member 715a includes an outer portion 715d' and an inner portion 715d", which together define a gap 715f therebetween for the movable window (not shown in FIG. 17) to pass therethrough. The upper portions 715d' and 715d" preferably further include seals (also not shown in FIG. 17) or the like to slidably engage the movable window as it is raised and lowered within the door assembly. The seals may be conventional seals or may be of the type discussed above with respect to cap assembly 114, and may be secured along or molded with the upper portion 715d of cap member 715a.

The door handle 718 and the upper portion of rear exterior assembly 710b for the rear door of the vehicle are substantially similar to the door handle and upper portion of front exterior assembly 710a, discussed above, such that a detailed discussion of rear assembly 710b will not be included herein.

Figure 18:
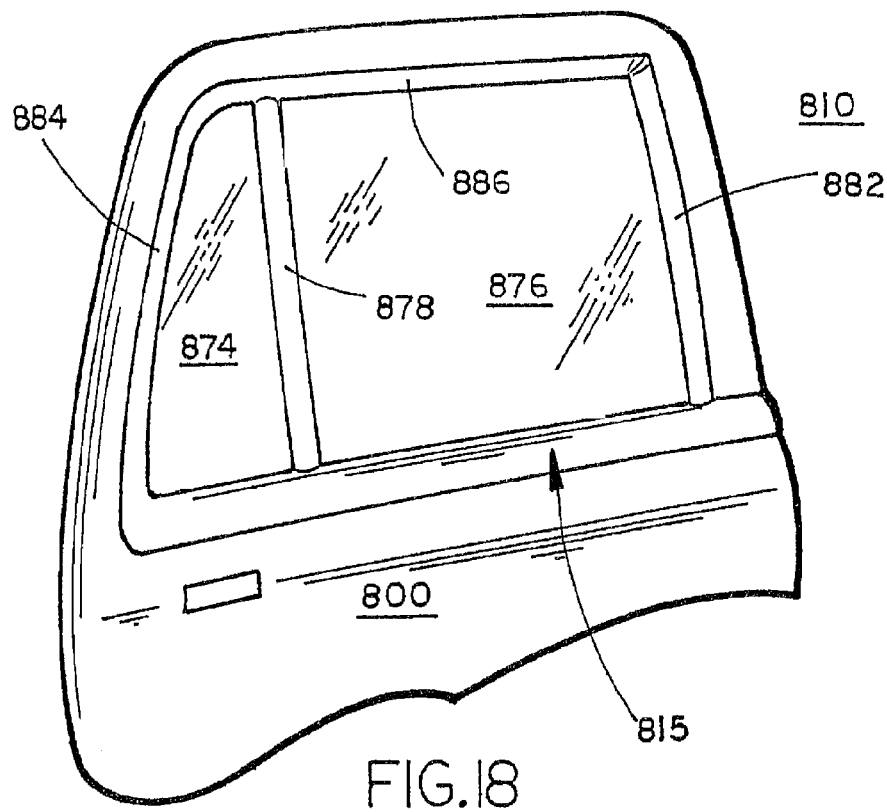
FIG. 18 is a side elevation of an alternate embodiment of the present invention, as installed on a vehicle door.

Referring now to FIGS. 18-22, a rear door exterior assembly 810 is mounted to a rear door 800 of a vehicle, such as to a door frame as described above. Exterior assembly 810 includes a lower, cap member or portion 815 and an upper, window frame portion 850 formed integrally and in one-piece with cap 815. Frame portion 850 includes a forward leg 882, a rearward leg 884, a divider or guide member 878 and an upper member 886. A fixed window 874 is secured between divider 878, cap member 815, rear leg 884 and a rearward portion of upper member 886. Each of the members 878, 884, 886 and 815 include window seals or the like (not shown in FIG. 18) for sealing fixed window relative to exterior assembly 810. Similarly, window seals are provided along front leg 882, forward portions of upper member 886 and cap member 815 and a forward edge of divider 878 for slidable or movable engagement with movable window 876 as the movable window is raised and lowered between its opened and closed positions. The seals and frame members may be formed as described above with respect to exterior assembly 510a, or may be formed as a two piece, snap together or "clamshell" frame, as discussed below. Alternately, however, the seals and window frame members or legs may be formed in other, known mariners, or may be formed as disclosed in commonly assigned, U.S. patent application Ser. No. 09/611,727, filed Jul. 7, 2000 by Davis et al. for VEHICLE WINDOW ASSEMBLY, now U.S. Pat. No. 6,220,650, without affecting the scope of the present invention. As shown in FIG. 18, exterior assembly 810 provides a finished trim strip or panel along the upper portion of the vehicle door panel and around the windows of the door assembly, once it is installed to the door frame.

Figure 19:
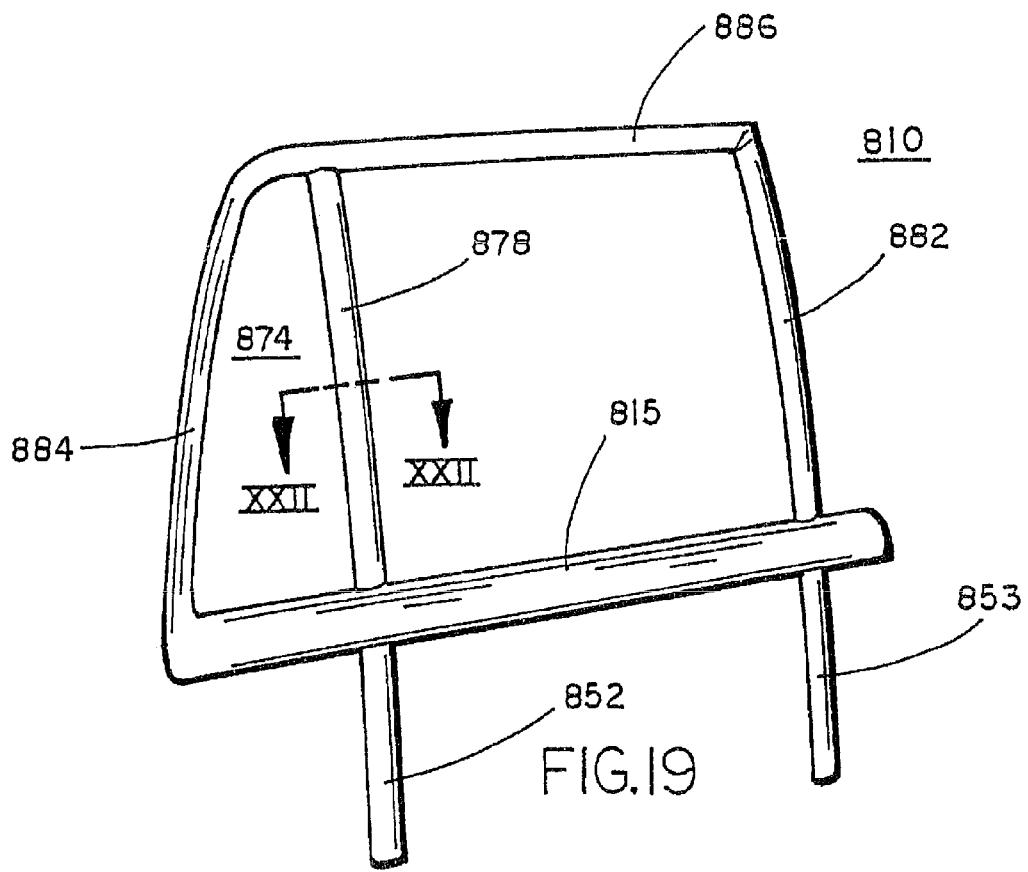
FIG. 19 is a side elevation of the module of FIG. 18 removed from the door.

Referring to FIG. 19, exterior assembly 810 preferably includes a pair of lower window tracks or channels 852 and 853 which extend downwardly from cap member 815 and guide the movable window therealong as the window (not shown in FIG. 19) is raised and lowered within the door. Preferably, channels 852, 853 of exterior assembly 810 are inserted within an opening in an upper portion of the door frame (not shown), prior to cap member 815 and window frame portion 850 snapping or otherwise securing to the door frame, similar to exterior assembly 410, discussed above and shown in FIG. 11.

Figure 20:
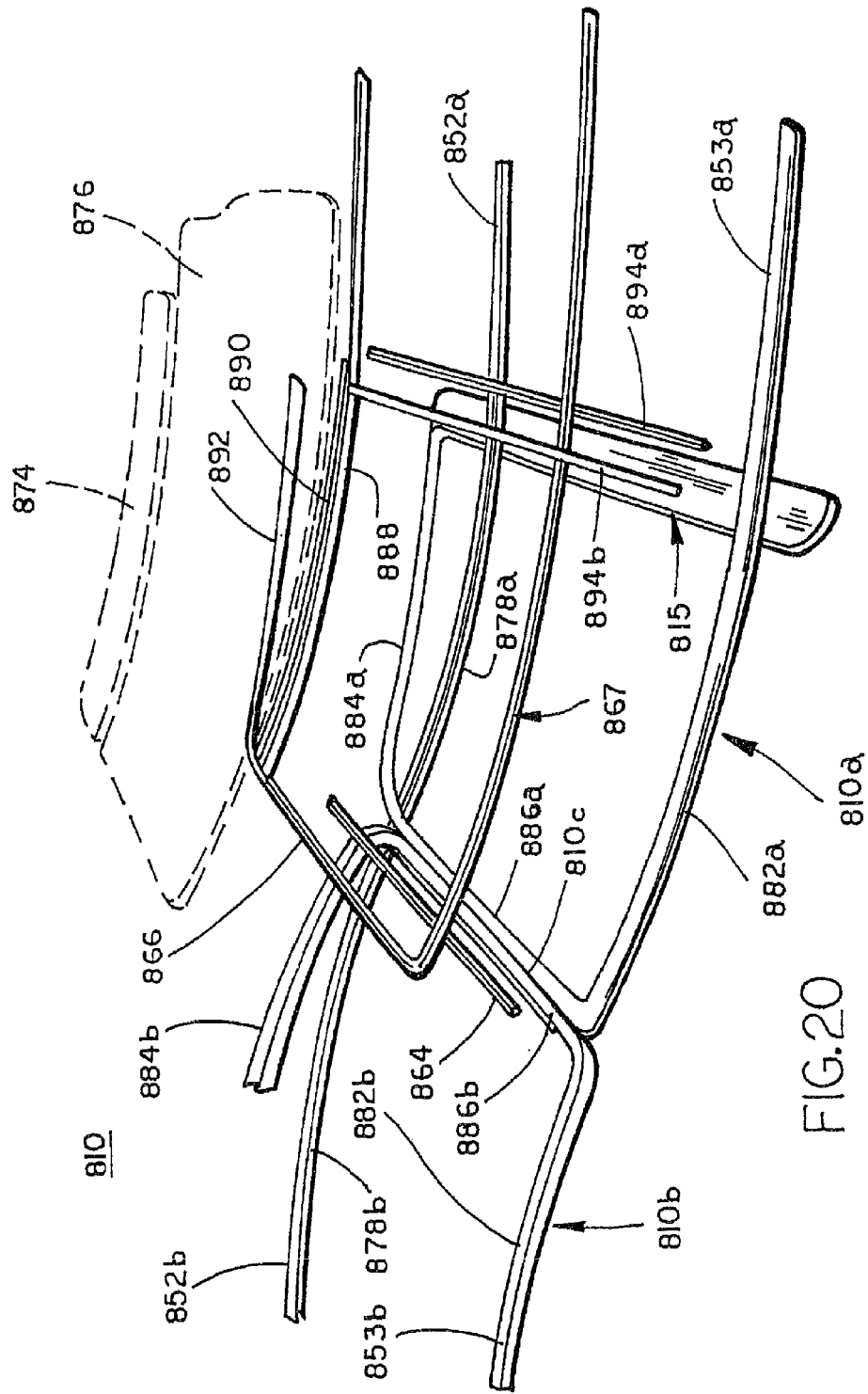
FIG. 20 is an exploded perspective view of another embodiment of a module in accordance with the present invention.
Figure 21:
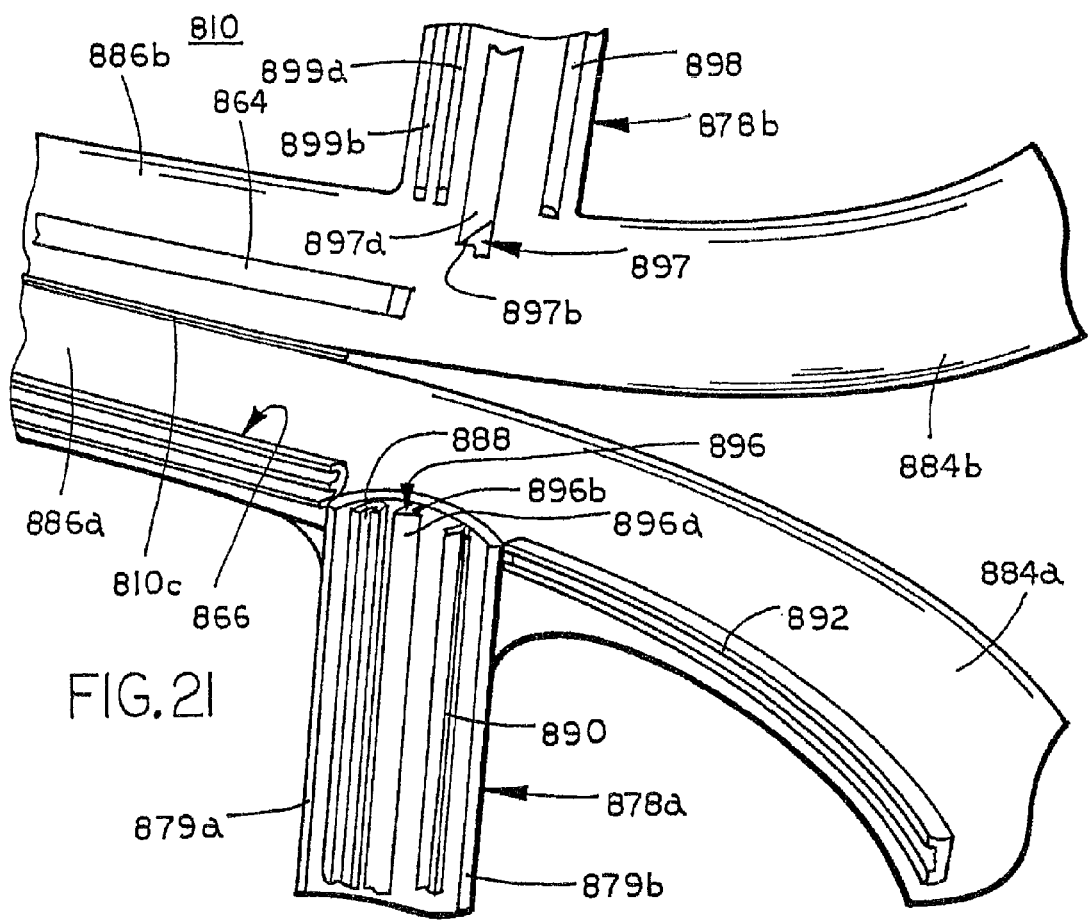
FIG. 21 is an enlarged perspective view of a portion of the module of FIG. 20.
Figure 22:
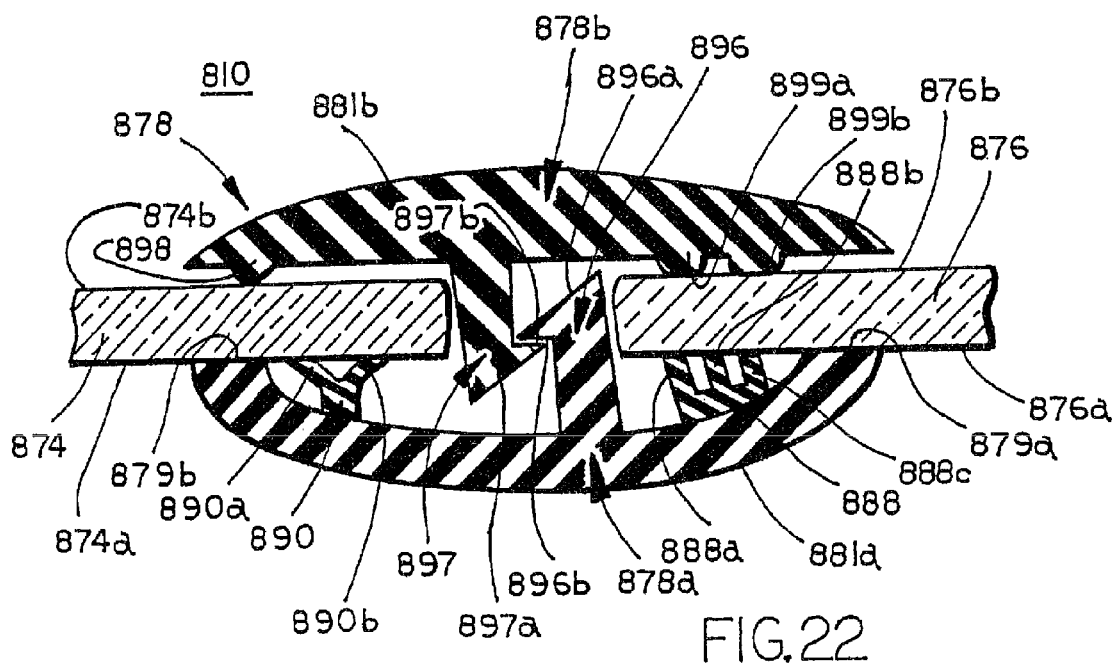
FIG. 22 is a cross sectional view of the seals and frame between a fixed and movable window of the module, taken along the line XXII-XXII in FIG. 19.

Exterior assembly 810 may be formed as a two piece or clamshell frame assembly, whereby the two pieces are snapped together about the seals and/or windows and may be interconnected via a living hinge 810c or the like, as shown in FIGS. 20-22. With reference to FIG. 20, exterior assembly 810 comprises an outer portion 810a and an inner portion 810b, which are connected along an upper edge via living hinge 810c. The outer and inner portions 810a, 810b pivot about hinge 810c to a closed or joined position, whereby the portions connect together to form exterior assembly 810, with the fixed window 874 and the window seals for the fixed window and movable window encased and secured therewithin, as discussed below. Preferably, the outer and inner portions 810a, 810b and hinge 810c are molded or formed of a polymeric material, as described below, with the window seals (discussed below) being molded with the portions 810a, 810b, such as part of a two shot molding process, or adhered or otherwise secured therealong using suitable adhesives or the like.

As best shown in FIG. 20, each of the outer and inner portions 810a, 810b of exterior assembly 810 include corresponding outer and inner portions of rear leg member 884a, 884b, divider 878a, 878b, front leg member 882a, 882b and upper member 886a, 886b, respectively. The outer and inner portions 810a, 810b are preferably unitarily formed or molded as a single unit joined at living hinge 810c. Alternately, however, the outer portion 810a may be molded separately from inner portion 810b, and then the components may be aligned and snapped or otherwise secured together, such as by bonding, welding or securing via mechanical fasteners or the like, to form the exterior assembly 810, without affecting the scope of the present invention.

Similar to exterior assembly 510a, exterior assembly 810 includes an upper compressible seal 864 positioned along an upper and forward region of inner portion 886b of upper member 886, and a flexible seal 866 positioned along outer portion 886a (FIGS. 20 and 21). Preferably, flexible seal 866 is unitarily formed with a forward leg seal 867 which extends along outer portion 882a of forward leg 882 and further along outer portion 853a of lower channel 853 for sliding engagement of a forward edge of movable window 876 as the window is vertically adjusted with respect to the door assembly. Additionally, a similar flexible seal 888 is provided along outer portion 878a of divider 878 and further along outer portion 852a of channel 852, for sliding engagement with a rearward edge of movable window 876. A fixed window seal 890 is also provided along outer portion 878a of divider 878, while a second fixed window seal 892 is provided along a rearward portion of outer upper member 886a and further along outer rearward member 884a, for sealing engagement with an exterior surface of fixed window 874. Preferably, fixed window seals 890 and 892 are compressible, Y or U-shaped seals, as shown in FIGS. 21 and 22. Additionally, a pair of lower window seals 894a, 894b (FIG. 20) are provided along cap member 815 for sliding engagement with the exterior and interior surfaces of movable window 876 and for sealing of a lower edge of fixed window 874. The inner seal 894b may be secured along an inner portion (not shown) of cap member 815, or may be secured to an interior trim component of the vehicle door (also not shown).

As shown in FIG. 21, seal 866 is a flexible seal positioned along a lower edge of outer upper portion 886a, while seal 864 is a compressible seal or bead along an upper edge of inner upper portion 886b. Accordingly, when the outer and inner portions 810a and 810b of exterior assembly 810 are closed together, the seals are positioned relative to one another and to the movable window in a substantially similar manner as seals 564 and 566, discussed above with respect to FIG. 14. Similarly, fixed window seal 892 extends along lower edge of a rearward portion of outer upper member 886a and along outer rearward portion 884a, such that fixed window seal 892 is compressed against an exterior surface of fixed window 874 when the exterior assembly 810 is closed together about fixed window 874.

As best shown in FIGS. 21 and 22, outer divider portion 878a includes a clasp or connector 896 extending generally along a center region of outer divider portion 878a, while inner divider portion 878b includes a corresponding clasp or connector 897 extending along its center region. Connectors 896, 897 comprise tapered ends 896a, 897a, forming camming surfaces which cause connectors 896, 897 to flex slightly as divider portions 878a, 878b are pressed toward one another and the outer and inner portions 810a, 810b are closed together, and locking surfaces 896b, 897b, which engage one another after the connectors are pressed together and prevent separation of the outer and inner portions 810a, 810b (FIG. 22). Similar connectors (not shown) may be provided along the other members of the exterior assembly to further secure the outer and inner portions of exterior assembly 810 together. Inner divider portion 878b preferably further includes a raised, fixed window contact 898 and a pair of movable window contacts 899a, 899b, which extend along opposite sides of connector 897 from fixed window contact 898.

Movable window seal 888 and fixed window seal 890 extend along opposite sides of connector 896 on outer divider portion 878a. Movable window seal 888 is preferably a multi-fingered or multi-lipped seal having three fingers 888a, 888b, 888c, while fixed window seal 890 is preferably a Y-shaped seal having a pair of diverging lips or seal portions 890a, 890b, which flex as they are compressed against the exterior surface 874a of the fixed window 874(FIG. 22). The outer edges 879a, 879b of outer divider portion 878a preferably provide substantially flat surfaces which abut the movable window 876 and the fixed window 874, respectively, to provide a finished appearance to divider 878 when the assembly is closed about the windows (FIG. 22).

As shown in FIG. 22, when outer portion 810a is mated with inner portion 810b of exterior assembly 810, locking surfaces 896b, 897b of connectors 896, 897 engage one another to secure the outer and inner portions together along divider 878. Fixed window contact 898 on inner divider portion 878b engages the interior surface 874b of fixed window 874 to press window 874 toward seal 890 on outer divider portion 878a and maintain fixed window 874 clamped within divider 878. Fixed window 874 is thus secured within outer and inner portions 810a, 810b, with its exterior surface 874a pressing against seals 890, 892 and a portion of lower seal 894a, such that fixed window 874 is sealed along its perimeter edges to substantially reduce wind and/or water intrusion into the vehicle. Flat surface 879b abuts against exterior surface 874a of fixed window 874 to conceal the seal 890 and provide a finished exterior appearance to the window assembly.

Similar to fixed window 874, discussed above, movable window 876 is secured at least partially about its perimeter edges between the outer and inner divider portions 878a, 878b, except that movable window is slidably secured between the divider portions. As best seen in FIG. 22, when the divider portions 878a, 878b are secured together, movable window contacts 899a, 899b engage the interior surface 876b of movable window 876 and press the exterior surface 876a of movable window 876 into engagement with flexible seal 888, whereby the fingers 888a, 888b, 888c flex as they engage and slide along exterior surface 876a of movable window 876. Preferably, movable window contacts 899a, 899b and seal 888 provide a low coefficient of friction surface to allow smooth sliding of movable window 876 therealong. Flat surface 879a of outer divider portion 878a abuts or is slightly spaced from exterior surface 876a of movable window 876 to again conceal seal 888 and provide a finished appearance to divider 878. An outer curved surface 881a of outer divider portion 878a and an inner curved surface 881b of inner divider portion 878b provide a finished trim appearance for the divider 878 from both the exterior and interior of the door assembly when the exterior assembly 810 is mounted to the door frame.

Accordingly, when outer and inner portions 810a, 810b are secured together, exterior assembly 810 provides a finished trim appearance to the window frame area of the rear door. The finished assembly, which includes the window trim region, the fixed window, and may include the movable window as well, and the window seals, may then be readily installed into the door of the vehicle in accordance with the exterior assemblies discussed above. The assembly may be installed at the door assembly plant or at the vehicle assembly plant, without affecting the scope of the present invention.

Although shown and described as being implemented with an exterior assembly or module for a vehicle door, it is further envisioned that a clamshell or two piece window frame assembly, utilizing aspects of inner and outer portions 810b, 810a of exterior assembly 810 discussed above, may be equally applicable to an exterior front door or rear panel module or assembly of the present invention, or other non-modular window frame assemblies, such as conventional frame and seal designs, or frames of the type disclosed in U.S. patent application Ser. No. 09/611,727, filed Jul. 7, 2000 by Davis et al. for VEHICLE WINDOW ASSEMBLY, now U.S. Pat. No. 6,220,650.

Accordingly, the present invention provides an exterior accessory module or assembly which is easily mountable to a vehicle door or frame at the vehicle assembly plant or at a modular door integrator's door assembly plant or assembly line. The exterior assembly may comprise an exterior mirror body which is connectable to a mirror mounting portion of the vehicle door, a cap or cover assembly which is connectable along an upper portion of the vehicle door frame, and/or a window frame assembly which is connectable along a window portion of the door frame. The assembly may include one or more accessories, such as an exterior rearview mirror assembly, a door handle, a window mechanism, window seals and/or the like, which are also connectable to appropriate connectors or mechanisms of the door as the cap assembly is mounted to the door. The exterior assembly or accessory module of the present invention is thus mountable to a vehicle modular door assembly and provides one or more accessories for the door.

Preferably, the exterior accessory module or assembly, such as an exterior rearview mirror body or a cap or cover assembly, may be supplied to the vehicle assembly plant using just-in-time sequencing methods, as is commonly known in the automotive supply art. Just-in-time and/or sequencing techniques can be used to supply specific options, such as, for example, having an optional exterior rearview mirror, or powered mirror adjusters versus manual adjustment of the reflective element, (or having security lights within the mirror) for an individual vehicle as it passes down the vehicle assembly line. Thus, the vehicle manufacturer can offer a wide array of options to a consumer from an option menu. Should a specific customer select power mirrors or the like for a particular vehicle due to be manufactured by the vehicle manufacturer at a particular location on a specific day/hour, then the mirror system supplier or other specialist supplier and/or cap assembly supplier sends to the door or vehicle assembly line or plant, in sequence and/or just in time, a mirror body assembly and/or a cap assembly with a power adjustable exterior rearview mirror for that particular door or vehicle produced that day on the assembly line. The door or vehicle manufacturer or door integrator may offer options for the exterior rearview mirror which correspond to an optional interior rearview mirror as well, such as an electrochromic mirror system, such as disclosed in commonly assigned U.S. Pat. No. 5,424,898, issued to Larson et al., the disclosure of which is hereby incorporated herein by reference. The accessory module, such as an exterior rearview mirror body and/or a cap assembly and corresponding exterior mirror body and/or handle may then be sequenced with the corresponding interior mirror for doors or vehicles with that option.

Such just-in-time, in-sequence supply (which can be used for the incorporation of the various added features recited herein) is further facilitated when the vehicle utilizes a car area network (CAN) such as described in Irish Pat. Application No. 970014 entitled A VEHICLE REARVIEW MIRROR AND A VEHICLE CONTROL SYSTEM INCORPORATING SUCH MIRROR, application dated Jan. 9, 1997, the disclosure of which is hereby incorporated herein by reference, or when multiplexing is used, such as disclosed in U.S. patent application Ser. No. 08/679,681 entitled VEHICLE MIRROR DIGITAL NETWORK AND DYNAMICALLY INTERACTIVE MIRROR SYSTEM, filed Jul. 11, 1996 by O'Farrell et al., now U.S. Pat. No. 5,798,575, the disclosure of which is hereby incorporated herein by reference. Because the exterior accessory assembly may optionally be equipped with one or more accessories, it is useful to equip the assembly, cap, mirror body, and the mounting region of the door frame with standard connectors, such as for example, a ten-pin parallel connector, such as electrical sockets or connections for receiving a plug connector, so that a common standard wiring connector can be provided to the mirror mount on all of the modular doors. Naturally, multiplexing within the vehicle may help alleviate the need for more pins on such a connector, or may allow a given pin or set of pins to control more than one function.

Also, the exterior assembly of the present invention encompasses many different types of clip-on, snap-on or similar panels for attachment to the frame of a modular door assembly; and with the cap assembly at least including an external portion (such as an exterior mirror casing/exterior mirror reflector element) of an exterior rearview mirror assembly and/or an external portion (such as a door handle) of a door handle assembly and/or an external portion (such as a keyhole) of a door lock assembly. The exterior assembly of the present invention may comprise a portion of a door exterior side panel (such as illustrated in FIGS. 3, 4, 7-11, 13, 15, 16 and 18) or may comprise substantially an entire door exterior side panel (such as illustrated in FIG. 10).

The mirror assembly, cap assembly or exterior assembly (or any component thereof) is preferably molded from a polymeric material such as PC, PC/PBT, ASA, PP/ASA, an ionomer resin, a nylon resin, ABS, and the like. This may be painted [in which case, benefit can be had by pretreating the plastic resin in a priming/activating step (such as disclosed in commonly assigned, co-pending U.S. patent application Ser. No. 09/489,322, filed Jan. 21, 2000 by Ten-Jen Chu, the disclosure of which is hereby incorporated herein by reference) in order to enhance paint adhesion to the plastic body]. Alternatively, the mirror assembly cap assembly (or any component thereof) can be formed by molding a colored resin so as to obtain a molded-in-color part that is either body color matched to the rest of the vehicle or that provides an accent color to the rest of the vehicle. In this regard, molded-in-color resins such as Baxloy™ ionomer available from DuPont of Wilmington, Del. can be used or Surlyn Reflection™ (an ionomer/nylon blend from DuPont), or W-4™ which is a high-gloss, weatherable, solid color molding resin available from GE Plastics. Such materials are preferably scratch resistant and weatherable (particularly to solar UV). Other materials suitable to use, and in particular for molded-in-black, high gloss mirror or cap assemblies (and components thereof) include PMMA, PP/PMMA (HIVALLOY™ from Montell), ASA (LURAN S™ from BASF or CENTREX™ from Bayer) and PC/PBT (Xenoy from GE). Note that components of the exterior assembly and/or cap assembly (such as an exterior mirror housing or a door handle) can be made from the above materials. Also, where weight is a concern, lightweight accessory module materials can be formed by foamed polymer materials, and in particular foamed engineering plastic materials. Such foamed plastic moldings/parts can be formed such as by the MUCELL™ process available from Trexel of Woburn, Mass. In the MUCELL™ process, as best understood, a gas (such as nitrogen or argon) is pumped into an injection mold while an assembly component or cap assembly is being molded, resulting in a multi-void "aerated" molded structure that is light weight because of the multiple-voids introduced during the molding step. Use of such a MUCELL™ process to form light weight parts is useful such as for the mirror reflector-containing casings of exterior mirror assemblies, the sail or mounting part of exterior mirror assemblies, the minor reflector backing plates that attaches the mirror elements of exterior mirror assemblies to their actuators, and for door handles.

Also, as an alternate to painting, such as spray painting to decorate a mirror head or cap assembly or component thereof (such as the minor reflector-containing casings of exterior mirror assemblies, the sail or mounting part of exterior mirror assemblies, the mirror reflector backing plates that attach the mirror elements of exterior mirror assemblies to their actuators, and the door handles), in-mold films (such as are disclosed in commonly assigned, U.S. patent application Ser. No. 09/564,665, filed May 1, 2000 by Tun-Jen Chu for CONSOLIDATED EXTERIOR SIDEVIEW MIRROR ASSEMBLY INCORPORATING AN IN-MOLD FILM PROCESS, now U.S. Pat. No. 6,310,738, the disclosure of which is hereby incorporated herein by reference) can be used for decoration. Such in-mold films (supplied in a variety of colors and finishes) allow a Class A decorative finish to be achieved on the MUCELL™—formed outer part surface that typically, because of the aerated nature of its formation that results in up to 40% weight saving compared to non-aerated materials, has a poor surface quality that requires decoration. Note such in-mold film decoration of the parts is particularly advantageous for MUCELL™ molded mirror reflector-containing casings of exterior mirror assemblies, for the sail or mounting part of exterior mirror assemblies, for the mirror reflector backing plates that attach the mirror elements of exterior mirror assemblies to their actuators, and for door handles. An alternate in-mold decoration technique suitable for these and for other components of cap assemblies is injection molding with paint such as the granular injection paint technology available from Warwick University, UK. Also, multicomponent/multilayer molding, as known in the molding art, can be used for the mirror head assembly or the cap assembly (or any component thereof). In multicomponent/multilayer molding, individual polymer resins are molded in a common mold to form a multilayer of a plurality of separate and individual polymer material layers of the part. In multilayer molding, the polymer materials of the individual layers do not mix, and thus each individual layer retains its individual material property and performance.

Also, when forming the modular door and/or the frame, the mirror mount, the mirror head, the exterior assembly and/or the cap assembly (and/or any component thereof), electrical connectors, conduits, supports, clips, fasteners, lead-frames, connectors and the like can be integrally molded (as is known in the molding art) during the molding of the modular door frame and/or the exterior assembly (and/or any component thereof). Also, electronic accessories, such as a passive entry antenna/device, a microwave antenna, a GPS antenna, an RF antenna, an AM/FM antenna, a remote keyless entry device, a remote transaction device, a video camera device (such as a blind spot monitoring video camera), a security/ground illumination light, a turn signal light, a keyhole illuminating light (such as a light emitting diode) and/or a side indicator device and/or the like, can be included in the mirror head, the cap assembly (such as in a door handle or in an exterior mirror assembly), and/or along the window frame portion or door panel portion of the assembly, where applicable. In applications where the exterior assembly provides the entire exterior door panel, the panel may further include a running board and lights therealong for illuminating the running board. Also, the cap assembly of this present invention can comprise a rear door cap assembly, which may include a rear door handle and/or other accessories.

Using this present invention, a modular door manufacturer can manufacture a modular door frame, with or without a window frame portion, and equip this with mechanical and electrical components/connectors that connect with and/or connect to mechanical and/or electrical components/connectors of the exterior assembly, such as the rearview mirror assembly or the cap assembly (the cap assembly may be supplied, optionally, to the modular door manufacturer by another manufacturer that specializes in exterior mirrors and/or door handles). In this regard, the connectors and methods disclosed above with respect to the mirror head and mount can be used to allow the exterior assembly or cap assembly to attach to the modular frame. By using these concepts, the automaker can choose to buy a standard modular door frame from a modular door manufacturer. This modular door frame can then be equipped with the desired color and feature content of the exterior mirror assembly and/or the exterior door handle assembly of the accessory module either at the modular door manufacturing plant or at the automaker assembly plant.

The exterior assembly, mirror assembly or cap assembly of the present invention is equipped with mechanical snaps and fasteners and with electrical/electronic plugs, sockets and connectors so that when the accessory module attaches to and mounts to the modular door frame, mechanical and/or electrical/electronic connections are made for the exterior mirror assembly and/or the exterior door handle assembly to corresponding mechanical and/or electrical/electronic connectors, structures and/or devices of the modular door frame. This allows a "plug and play" capability that eases manufacture and reduces costs. It also reduces service complexity and cost in the field. Further, an exterior mirror assembly and/or sail of the cap assembly may mount to the cap assembly in accordance with the connectors or mounting portions of the mirror body 16 and mirror mount 14, discussed above. Preferably, this mounting is by a breakaway connection. The modular door frame may be formed of a metal material and/or of a high strength, structural engineering polymer material or composite material, as known in the materials art. Also, although preferably formed from a polymer or composite material, the exterior assembly or cap assembly (or any component thereof) can be formed in whole or in part of a metal material or a ceramic material.

Although described above as being installed to a vehicle modular door, aspects of the present invention are equally applicable to non-modular doors as well. The exterior assembly, cap assembly or mirror head may be mounted to a door frame or mount of the non-modular door as the door is assembled at a door assembly line or at the vehicle along the vehicle assembly line. The modular door or the non-modular door assembly may be assembled at a door assembly line remote from the vehicle assembly plant, such as at a door manufacturing plant, or along a door assembly line at the vehicle assembly plant and generally alongside the vehicle assembly line, or on the vehicle as the vehicle moves along the vehicle assembly line.

Therefore, the present invention provides a door assembly which facilitates easy attachment of an exterior accessory module or assembly, such as an exterior rearview mirror or a cap assembly, which further includes the door handle and/or exterior rearview mirror body, and which may also or otherwise include a window trim portion and associated seals, after the door has been installed to the vehicle within the vehicle assembly plant. This provides an improved assembly process for assembling exterior accessories and trim to the vehicle door or doors. The exterior assembly mates with and readily connects to the modular door or door frame, while the accessories of the exterior assembly correspondingly mate with or readily connect to appropriate electrical and/or mechanical connectors or linkages at the door. The exterior assembly may or may not include an exterior door panel as well. The exterior door panel may then be the last component or item snapped onto or otherwise secured to the door assembly during the assembly process, and may be the first item removed for servicing the door or components thereof and/or for replacing the exterior panel. This allows for substantially improved assembly and service processes, because the components of the door assembly may be accessed from the exterior side of the vehicle door via removal of the exterior panel. Additionally, the exterior panel may be replaced if it is damaged, without having to replace the entire door assembly. The exterior assembly may be mechanically and/or electrically connected to a mounting region of the modular door while the vehicle travels along the assembly line. Preferably, the connecting portions for mechanically and electrically connecting the components together are standard/common connecting means, such that the exterior module, mirror and/or cap assemblies may be easily mountable to one or more frames for various vehicle door designs and applications.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A window assembly for a vehicle, said window assembly comprising:
    an outer frame portion;
    an inner frame portion, said inner frame portion being hingedly attached to said outer frame portion via a hinge portion;
    at least one sealing element established along a sealing portion of at least one of said outer frame portion and said inner frame portion; and
    wherein said outer frame portion is pivoted relative to said inner frame portion and about said hinge portion to a closed position, said outer frame portion being connected to said inner frame portion when in said closed position to secure said at least one sealing element therebetween; and
    wherein said outer and inner frame portions comprise polymeric frame portions and wherein said hinge portion comprises a living hinge integrally molded with said outer and inner frame portions.

2. The window assembly of claim 1 further comprising a window panel at said sealing portion of said at least one of said outer frame portion and said inner frame portion, said outer frame portion and said inner frame portion cooperating to fixedly retain said window panel relative to said outer and inner frame portions when in said closed position.

3. The window assembly of claim 1, wherein said at least one sealing element is molded with at least one of said outer and inner frame portions.

4. The window assembly of claim 1, wherein each of said outer frame portion and said inner frame portion comprises an upper frame portion, a forward frame portion and a rearward frame portion that cooperate to define at least one window opening when said outer and inner frame portions are in said closed position.

5. The window assembly of claim 4, wherein said window opening receives one of a fixed window panel and a movable window panel.

6. A window assembly for a vehicle, said window assembly comprising:
    an outer frame portion;
    an inner frame portion, said inner frame portion being hingedly attached to said outer frame portion via a hinge portion;
    at least one sealing element established along a sealing portion of at least one of said outer frame portion and said inner frame portion; and
    wherein said outer frame portion is pivoted relative to said inner frame portion and about said hinge portion to a closed position, said outer frame portion being connected to said inner frame portion when in said closed position to secure said at least one sealing element therebetween; and
    wherein said outer frame portion is connected to said inner frame portion when in said closed position via a snap connection.

7. A window assembly for a vehicle, said window assembly comprising:

an outer frame portion;

an inner frame portion, said inner frame portion being hingedly attached to said outer frame portion via a hinge portion;

at least one sealing element established along a sealing portion of at least one of said outer frame portion and said inner frame portion;

wherein said outer frame portion is pivoted relative to said inner frame portion and about said hinge portion to a closed position, said outer frame portion being connected to said inner frame portion when in said closed position to secure said at least one sealing element therebetween;

wherein each of said outer frame portion and said inner frame portion comprises an upper frame portion, a forward frame portion and a rearward frame portion that cooperate to define at least one window opening when said outer and inner frame portions are in said closed position; and a divider frame portion extending from said upper frame portion and extending between said forward and rearward frame portions, and wherein said upper frame portion, said divider frame portion and said rearward frame portion cooperate to define a fixed window opening for receiving a fixed window panel therein when said outer and inner frame portions are in said closed position, and wherein said upper frame portion, said divider frame portion and said forward frame portion cooperate to define a movable window opening for movably receiving a movable window panel therein when said outer and inner frame portions are in said closed position.

8. The window assembly of claim 7, wherein said at least one sealing element is molded with at least one of said outer and inner frame portions.

9. The window assembly of claim 6 further comprising a window panel at said sealing portion of said at least one of said outer frame portion and said inner frame portion, said outer frame portion and said inner frame portion cooperating to fixedly retain said window panel relative to said outer and inner frame portions when in said closed position.

10. The window assembly of claim 6, wherein each of said outer frame portion and said inner frame portion comprises an upper frame portion, a forward frame portion and a rearward frame portion that cooperate to define at least one window opening when said outer and inner frame portions are in said closed position.

11. The window assembly of claim 10, wherein said window opening receives one of a fixed window panel and a movable window panel.

12. The window assembly of claim 6, wherein said at least one sealing element is molded with at least one of said outer and inner frame portions.

* * * * *

UNITED STATES PATENT AND TRADEMARK OFFICE
CERTIFICATE OF CORRECTION

| | |
|---|---|
| PATENT NO. | : 8,186,741 B2 |
| APPLICATION NO. | : 12/776783 |
| DATED | : May 29, 2012 |
| INVENTOR(S) | : Niall R. Lynam et al. |

It is certified that error appears in the above-identified patent and that said Letters Patent is hereby corrected as shown below:

Column 17
Line 62, "551 a" should be --551a--

Column 21
Line 1, "mariners" should be --manners--

Column 25
Line 50, "minor" should be --mirror--
Line 55, "minor" should be --mirror--

Signed and Sealed this
Sixth Day of November, 2012

David J. Kappos
*Director of the United States Patent and Trademark Office*